US008854201B1

(12) United States Patent
Hertz et al.

(10) Patent No.: US 8,854,201 B1
(45) Date of Patent: *Oct. 7, 2014

(54) DETACHABLE VEHICLE TAILLIGHT AND FLASHLIGHT COMBINATION

(71) Applicants: Allen D. Hertz, Boca Raton, FL (US); Eric L. Hertz, Satellite Beach, FL (US)

(72) Inventors: Allen D. Hertz, Boca Raton, FL (US); Eric L. Hertz, Satellite Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/049,153

(22) Filed: Oct. 8, 2013

Related U.S. Application Data

(60) Division of application No. 13/569,173, filed on Aug. 7, 2012, now Pat. No. 8,552,852, which is a continuation-in-part of application No. 12/947,659, filed on Nov. 16, 2010, now Pat. No. 8,237,557, which is a continuation-in-part of application No. 11/562,389, filed on Nov. 21, 2006, now Pat. No. 7,834,750.

(60) Provisional application No. 60/793,849, filed on Apr. 20, 2006, provisional application No. 60/742,471, filed on Dec. 5, 2005, provisional application No. 60/739,069, filed on Nov. 22, 2005.

(51) Int. Cl.
  *B60Q 7/00* (2006.01)
  *B60Q 1/26* (2006.01)
  *B60Q 7/02* (2006.01)

(52) U.S. Cl.
  CPC .................................... *B60Q 7/02* (2013.01); *B60Q 1/2692* (2013.01)
  USPC ........... 340/473; 340/468; 340/469; 340/671; 362/487; 362/496; 362/485

(58) Field of Classification Search
  USPC ........ 340/468, 469, 485, 471, 472, 436, 473; 362/487, 496, 505, 506, 485, 508, 523, 362/540, 543, 544, 545, 549
  See application file for complete search history.

(56) References Cited

U.S. PATENT DOCUMENTS

| | | |
|---|---|---|
| 4,745,525 A | 5/1988 | Sheehy |
| 4,839,629 A | 6/1989 | Brown |
| 4,896,136 A | 1/1990 | Hotovy |
| 5,126,926 A | 6/1992 | Chiang Wen |
| 5,144,538 A | 9/1992 | Harris |
| 5,393,115 A | 2/1995 | Hamilton |
| 5,550,718 A | 8/1996 | Shy |
| 5,648,756 A | 7/1997 | Zadok |
| 5,844,367 A | 12/1998 | Agans, Jr. |
| 6,065,423 A | 5/2000 | Hensel |

(Continued)

*Primary Examiner* — Toan N Pham
(74) *Attorney, Agent, or Firm* — Allen D. Hertz, P.A.; Allen D. Hertz

(57) ABSTRACT

A safety light system integrated into a vehicle. The safety light system includes a safety light assembly receptacle carried by a body panel of a vehicle. The safety light assembly receptacle includes a light assembly receiving cavity for receiving and temporarily retaining a removable light assembly. The removable light assembly includes elements to provide a user controlled continuous red light, a flashing red light, and a continuous white light. The flashing red light provides a roadside flare configuration. The continuous white light provides a flashlight configuration. The continuous red light in conjunction with the flashing red light configuration provides a driving light configuration. The removable light assembly can include a securing mechanism for attaching the removable light assembly to an object to warn others of the extended object and/or support legs enabling operation as a roadside flare, spotlight, and the like.

20 Claims, 24 Drawing Sheets

(56) References Cited

U.S. PATENT DOCUMENTS

| | | |
|---|---|---|
| 6,137,419 A | 10/2000 | Lennox et al. |
| 6,260,990 B1 | 7/2001 | Saunders |
| 6,322,238 B1 | 11/2001 | Barr |
| 6,727,806 B1 | 4/2004 | Massie et al. |
| 6,799,873 B2 | 10/2004 | Fox |
| 6,863,482 B2 | 3/2005 | Lockhart et al. |
| 6,918,624 B2 | 7/2005 | Miller et al. |
| 6,927,540 B1 | 8/2005 | Zich |
| 6,935,671 B2 | 8/2005 | Bruford et al. |
| 6,966,595 B2 | 11/2005 | Bruford et al. |
| 6,983,972 B2 | 1/2006 | Tan et al. |
| 7,070,222 B2 | 7/2006 | Bruford et al. |
| 7,111,886 B1 | 9/2006 | Miller et al. |
| 8,552,852 B1 * | 10/2013 | Hertz et al. .................. 340/468 |
| 2005/0121933 A1 | 6/2005 | Livingston |

* cited by examiner

DETACHABLE VEHICLE TAILLIGHT AND FLASHLIGHT COMBINATION

RELATED PATENT APPLICATION(S)

This application is a Divisional patent application, which claims benefit to U.S. patent application Ser. No. 13/569,173, filed on Aug. 7, 2012 (Issuing as U.S. Pat. No. 8,552,852), which is a Continuation-In-Part Application claiming benefit to U.S. patent application Ser. No. 12/947,659 filed on Nov. 16, 2010 (Issued as U.S. Pat. No. 8,237,557 on Aug. 7, 2012), which is a Continuation-In-Part claiming benefit to Non-Provisional patent application Ser. No. 11/562,389 filed on Nov. 21, 2006 (Issued as U.S. Pat. No. 7,834,750 on Nov. 16, 2010), which is a Non-Provisional Application claiming priority to each of Provisional Patent Application Ser. No. 60/793,849 filed on Apr. 20, 2006, Provisional Patent Application Ser. No. 60/742,471 filed on Dec. 5, 2005, and Provisional Patent Application Ser. No. 60/739,069 filed on Nov. 22, 2005, all of which are incorporated herein by reference.

FIELD OF THE INVENTION

The present invention relates to a removable safety light system for a vehicle, more specifically a lighting system comprising a light assembly that is removably secured to a receptacle, wherein the receptacle is integrated into a body panel of the vehicle.

BACKGROUND OF THE INVENTION

It is a common practice to position a tailgate of a pickup truck in a horizontal position when carrying loads that are longer than the internal length of the pickup bed. When carrying such a load, the user normally couples a red material to the end of the load to indicate to others of the extended length and location of the end of the load.

Several issues arise when positioning the tailgate of a pickup truck in a horizontal position. The first issue is the loss of protection by the bumper. Another being the potential for an accident wherein a vehicle behind the pickup truck would run into the carried load or the horizontal tailgate. On darker color trucks, it is more difficult to recognize when a tailgate is in a horizontal position at night. On a lighter color truck, it is more difficult to recognize when a tailgate is in a horizontal position during daylight. This is critical from both a rear view and a side view.

Pickup Trucks have been evolving. Pickup Trucks previously comprised of two doors, a bench seat, and a bed length of 8 feet. Current designs of pickup trucks are directed towards four doors, a luxury interior, and a shorter, somewhere between a 5½ and 6½ foot bed length. This change is directed more users to drive with the tailgate down.

A large number of states require red flags being at least 1 square foot be attached to objects that project 4 feet or more beyond the end of a vehicle. Additionally, a light or reflector is required to be attached to the object after dusk.

Fox (U.S. Pat. No. 6,799,873) teaches a third brake light, placing a "U" shaped attachment over the top edge of the tailgate. Fox is limited in a non-permanent item. The teachings need to be removable as it is highly susceptible to damage when loading cargo into the pickup bed, as it is taught to be an elevated object. Fox further teaches a unit that is only a third brake light assembly, similar to those integrated into current vehicles. Third brake lights are only illuminated when pressure is applied to the brakes. Therefore, Fox is teaching a means for additionally notifying another driver that the vehicle is braking.

What is desired is a tailgate safety light system, providing other drivers a means for continuously warning them that the tailgate is in a horizontal position and further providing others with the location of the end of the tailgate/extended load.

When a tailgate is up (vertical), the rearmost dimension of a vehicle is normally the bumper. When the tailgate is lowered (horizontal), the rearmost dimension of a vehicle is the top edge of the tailgate. When the tailgate is lowered, a vehicle containing rear proximity sensors no longer references the most rearward dimension of the vehicle.

What is desired is a means for utilizing the rear proximity sensors to reference the rearmost dimension of the vehicle, more so as the rearmost point changes.

SUMMARY OF THE INVENTION

One aspect of the present invention is a tailgate comprising a taillight positioned proximate the top surface of the tailgate.

A second aspect of the present invention is a tailgate comprising a taillight positioned within a recess within the top surface of the tailgate.

A third aspect of the present invention is a tailgate comprising a taillight wherein the taillight remains illuminated when the tailgate is in a horizontal position.

A fourth aspect of the present invention is a tailgate comprising a taillight wherein the taillight remains illuminated when the tailgate is in a horizontal position and the ignition switch is turned on.

A fifth aspect of the present invention is a tailgate comprising a taillight wherein the taillight comprising two illumination levels, a low level and a high level.

A sixth aspect of the present invention is a tailgate comprising a taillight wherein the taillight comprising two illumination levels, a low level and a high level, wherein the taillight is wired to further indicate when the vehicle is braking.

A seventh aspect of the present invention is a tailgate comprising a taillight wherein the taillight comprising two illumination levels, a low level and a high level, wherein the taillight is wired to further indicate when the vehicle is braking.

An eighth aspect of the present invention is a tailgate comprising a taillight wherein the taillight comprising two illumination levels, a low level and a high level, wherein the taillight is wired to further indicate desired vehicle turning direction.

A ninth aspect of the present invention is a device comprising a sensor, wherein the sensor indicates when the tailgate is positioned in a horizontal position.

An eleventh aspect of the present invention is a device comprising a sensor, wherein the sensor indicates when the tailgate is positioned in a horizontal position, the sensor being a tilt indicator.

A twelfth aspect of the present invention is a device comprising a sensor, wherein the sensor indicates when the tailgate is positioned in a horizontal position, the sensor being a switch which changes state when the tailgate is rotated away from the sidewall of the bed of the pickup truck.

A thirteenth aspect of the present invention is wherein the taillight is of an incandescent bulb.

A fourteenth aspect of the present invention is wherein the taillight is of at least on of an LED and a plurality of LED's.

A fifteenth aspect of the present invention utilizes a hinged light, wherein the hinged light is parallel and flush to the tailgate when the tailgate is upright. When the tailgate is rotated into a horizontal position, the safety light assembly rotates away from the sheet metal of the tailgate, maintaining a vertical position, but is then hanging from and perpendicular to the horizontal tailgate.

A sixteenth aspect of the present invention utilizes a slide-able safety light assembly; wherein the slide-able safety light assembly is vertical and inserted into the tailgate from the top edge of the tailgate when the tailgate is upright. When the tailgate is rotated into a horizontal position, the user would slide the slide-able safety light assembly out from within the tailgate, maintaining a position parallel to the tailgate, but a portion containing the light is then rotated into a position, which is perpendicular to the horizontal tailgate.

A seventeenth aspect of the present invention utilizes a temporary holding mechanism to temporarily hold the light in the desired position. An example secures the rotating portion of the safety light in a vertical position when the tailgate is in a horizontal position, thus maintaining the light steady over bumps.

An eighteenth aspect of the present invention utilizes a temporary holding mechanism to temporarily hold the light in the desired position, wherein the temporary holding mechanism comprising a ball and spring.

A nineteenth aspect of the present invention incorporates lights into the outboard side of the tailgate, wherein the lights are used to notify other drivers oblique to the direction of travel of subject vehicle that the tailgate is in a lowered position, and where the end of the tailgate is.

A twentieth aspect of the present invention incorporates lights into a tailgate bed extension apparatus, which is utilized to extend the bed length of the pickup truck. Such tailgate bed extension apparatus can comprise any known such designs.

A twenty-first aspect of the present invention incorporates a removable tailgate safety light assembly; wherein the removable tailgate safety light assembly is then temporarily coupled to an object that overhangs the rear edge of the pickup truck bed.

A twenty-second aspect of the present invention provides a method for compensating for a change in the rearmost position of a pickup truck. It is recognized that the same method can be applied to other vehicles such as Sport Utility Vehicles.

A twenty-third aspect of the present invention is the utilization of reflectors behind an illumination source to assist in directing the highest light intensity output.

A twenty-forth aspect of the present invention is the utilization of at least one of a red lens and an amber lens.

A twenty-fifth aspect of the present invention is the utilization of at least one of a red-colored bulb/LED and an amber-colored bulb/LED.

A twenty-sixth aspect of the present invention incorporates a removable tailgate safety light assembly; wherein the removable tailgate safety light assembly is provided power via at least one of retractable wires and rechargeable battery power.

A twenty-seventh aspect of the present invention provides a method for compensating for a change in the rearmost position of a pickup truck for a rear proximity sensing apparatus, wherein the method recognizes when the tailgate is in a horizontal orientation. The system contains at least two calibration factors: 1) Tailgate up and 2) tailgate down. When the tailgate is in a horizontal orientation, the system utilizes a tailgate down calibration factor for the rear proximity sensors—to determine the distance from an object to the furthest most point of the lowered tailgate. When the tailgate is in a vertical orientation, the system utilizes a tailgate up calibration factor for the rear proximity sensors—to determine the distance from an object to the furthest most point of the vehicle—normally the rear bumper.

A twenty-eighth aspect of the present invention is the incorporation of rear proximity sensors into the top edge of a tailgate.

A twenty-ninth aspect of the present invention is the utilization of a reflective medium to replace the tailgate safety lights for at least one of the tailgate safety light features.

A thirtieth aspect of the present invention is the utilization of reflective medium on the side of the tailgate.

A thirty-first aspect of the present invention is the utilization of reflector tape as the reflective medium.

A thirty-second aspect of the present invention is the utilization of a glass reflector as the reflective medium.

A thirty-third aspect of the present invention is the utilization of a plastic reflector as the reflective medium.

A thirty-fourth aspect of the present invention is the inclusion of the safety features in or onto a tailgate protective apparatus.

A thirty-fifth aspect of the present invention is the inclusion of the safety features in or onto a molded tailgate protective apparatus.

A thirty-sixth aspect of the present invention is the utilization of a tailgate safety light that is visible from both the rear of the tailgate and the top of the tailgate.

A thirty-seventh aspect of the present invention is a tailgate safety light, the tailgate safety light comprising an elongated illumination section and at least one end illumination section.

A thirty-eighth aspect of the present invention is a tailgate safety light, the tailgate safety light comprising a removable assembly and a securing member.

A thirty-ninth aspect of the present invention is a tailgate safety light, the tailgate safety light comprising a removable assembly, a securing member, and a spring release member.

A fortieth aspect of the present invention is a reflective medium, wherein the reflective medium is of any color.

A forty-first aspect of the present invention is a tailgate safety light, the tailgate safety light being of any legal color, including amber, red, green, blue, and the like.

A forty-second aspect of the present invention is a pullout safety apparatus, wherein the pullout safety apparatus is an assembly that couples to the hitch receiver.

A forty-third aspect of the present invention is a pullout safety apparatus, wherein the pullout safety apparatus is an assembly that couples to the hitch receiver and wherein power is provided by a trailer wiring coupler.

A forty-fourth aspect of the present invention is an assembly process of potting at least one LED to improve reliability.

A forty-fifth aspect of the present invention is an assembly process of molding in at least one LED.

A forty-sixth aspect of the present invention is a pull out step.

A forty-seventh aspect of the present invention is a pull out step, wherein the pullout step is stored within a tailgate.

A forty-eighth aspect of the present invention is a pull out step, wherein the pullout step is stored within a tailgate and pulls out from the top edge of the tailgate.

A forty-ninth aspect of the present invention is a pull out step, wherein the pullout step is stored within a tailgate, wherein the pullout step further comprising a taillight.

A fiftieth aspect of the present invention is a pull out step, wherein the pull out step comprising a hinged section.

A fifty-first aspect of the present invention is a pull out step, wherein the pull out step comprising a hinged section and a locking mechanism, wherein the locking mechanism secures the pull out step in a vertical orientation.

A fifty-second aspect of the present invention is a tailgate taillight comprising artwork.

A fifty-third aspect of the present invention is a tailgate taillight comprising a logo, such as the manufacturer logo.

A fifty-fourth aspect of the present invention is a pull out extension, wherein the pull out extension pulls out from the center of the top edge of a vehicle tailgate to provide support for longer objects.

A fifty-fifth aspect of the present invention is a pull out extension, wherein the pull out extension pulls out from the center of the top edge of a vehicle tailgate to provide support for longer objects, incorporating a taillight.

A fifty-sixth aspect of the present invention is an inclusion of a lock to maintain a removable safety light within a receptacle, the receptacle being integrated within the upper section of the tailgate.

A fifty-seventh aspect of the present invention comprises a telescoping frame to extend the light position to a location proximate a distal end of an object projecting from a bed of the pickup truck.

It is recognized that the pullout apparatus can be utilized on any type of vehicle. Further, the pullout apparatus can be incorporated into the factory taillight, inside wall of a pickup truck bed, and the like.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
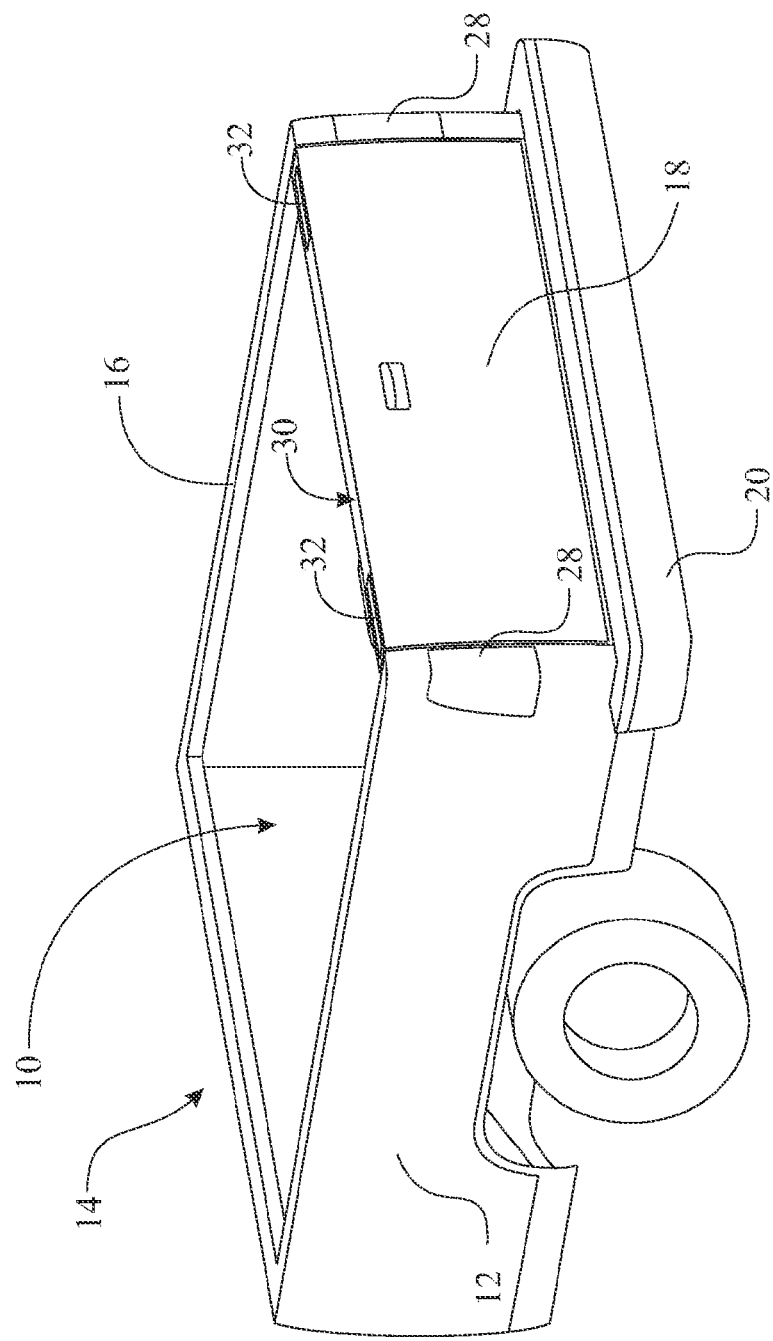
FIG. 1 presents an isometric view of an exemplary pickup truck bed illustrating the present invention in a first embodiment with the tailgate in a vertical position.

FIG. 1 is an isometric view of a Pickup truck bed comprising a vehicle storage area 10. The vehicle storage area 10 comprises a contained storage area boundary that is created by two storage area sidewalls 12, a storage area front wall 14, and a vehicle tailgate 18. The vehicle tailgate 18 is shown in a vertical or secured position. A bed rim 16 surrounds the upper edge of the vehicle storage area 10. A tailgate top surface 30 completes the upper perimeter of the vehicle storage area 10. The view further illustrates standard taillight(s) 28. The view further illustrates a rear bumper 20 that is commonly considered a standard component of a pickup truck or similar vehicle. Alternatively, a rear valance can replace the rear bumper 20. A pair of tailgate safety light(s) 32 is installed inside the tailgate top surface 30 in accordance with a first embodiment of the present invention. The tailgate safety light(s) 32 are not illuminated when the vehicle tailgate 18 is in the vertical or closed position, as shown. It is recognized that although a pair of tailgate safety light(s) 32 are the preferred embodiment of the present invention, the number or placement of the tailgate safety light(s) 32 should not circumvent the spirit and intent of the present invention.

Figure 2:
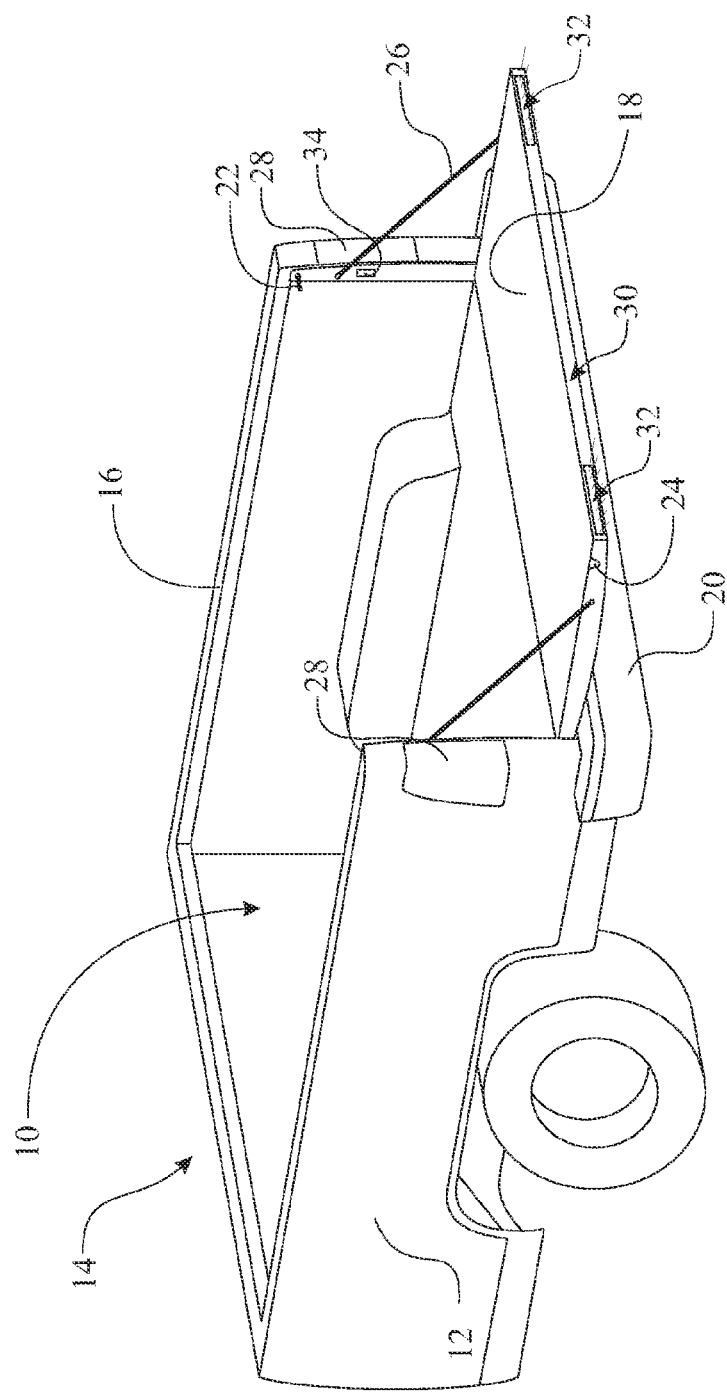
FIG. 2 presents an isometric view of the exemplary pickup truck bed illustrating the present invention in the first embodiment with the tailgate in a horizontal position.

FIG. 2 is an isometric view of the vehicle storage area 10 illustrating the present invention in an "in-use" orientation, wherein the vehicle tailgate 18 is rotated into a horizontal or lowered position. The vehicle tailgate 18 is hinged such that the vehicle tailgate 18 can rotate into the horizontal position. A tailgate latch pin 22 used in conjunction with a tailgate latch 24 may be (or is) incorporated in the vehicle tailgate 18 to secure the vehicle tailgate 18 in the vertical position. A tailgate support cable 26 is coupled between an inner edge of the external sidewall 12 and the vehicle tailgate 18 as a means to aid in supporting the vehicle tailgate 18 in the horizontal position. The vehicle tailgate 18 shown in the horizontal or lowered position provides the user with an additional platform for holding objects, generally being used in the lowered position when the cargo is longer than the inside fore-aft dimension of the vehicle storage area 10. This is a common practice for pickup truck owners. The problem is that when the vehicle tailgate 18 is in the lowered position; it presents a hazard to vehicles around it. The bumper is no longer the first point of contact for an accident. Drivers tend to not pay as much attention to the tailgate, failing to recognize that it is 2.5-3' closer than normal. In some applications, the lowered vehicle tailgate 18 can in fact obscure the intent of normal warning signal protocols. The present invention addresses the concern and potential safety issue, as when the vehicle tailgate 18 is in the horizontal position, the tailgate safety light(s) 32 are illuminated such to provide a warning to other drivers during all lighting conditions (daytime or nighttime). A vehicle tailgate safety system (present invention) is activated by the inclusion of a tailgate safety light sensor 34 which identifies when the vehicle tailgate 18 in the horizontal position. The tailgate safety light(s) 32 are illuminated when the tailgate safety light sensor 34 indicates when the vehicle tailgate 18 is lowered into the horizontal position. It is desireable that the tailgate safety light(s) 32 are illuminated when both the tailgate safety light sensor 34 indicates such as well as at least one of a parking light is turned on and an ignition switch is turned on. This provides a safety feature when the vehicle tailgate 18 is lowered and the vehicle is either parked or in motion. Additionally, the combination of requirements to activate the tailgate safety light(s) 32 performs the function of simplifying and ensuring the use of the present invention.

Figure 3:
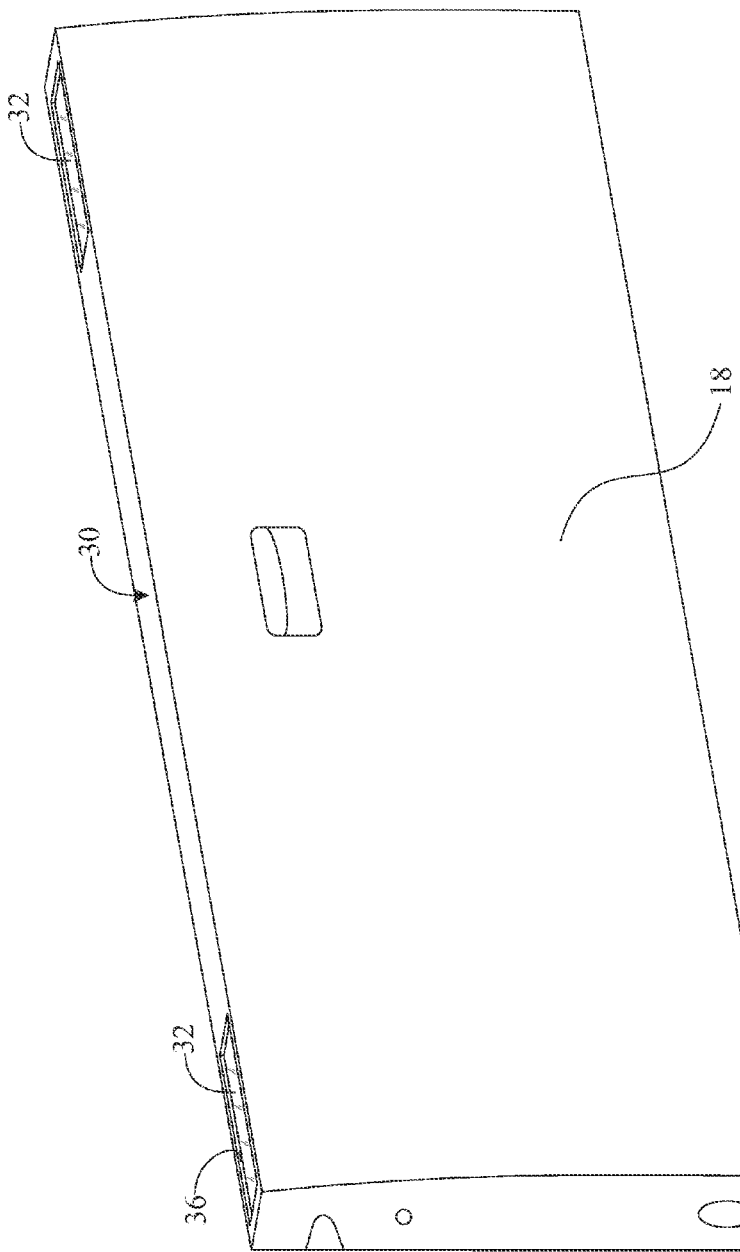
FIG. 3 presents an isometric view of the tailgate comprising the first embodiment of the present invention in more detail.

FIG. 3 is an isometric view illustrating additional details of the present invention. The illustration presents a pair of tailgate safety light(s) 32, wherein the tailgate safety light(s) 32 are positioned in a tailgate safety light recess 36 located in the tailgate top surface 30. The tailgate safety light recess 36 provides some protection to the tailgate safety light(s) 32, as it is commonplace to rest object along the tailgate top surface 30. Alternately (or in conjunction with), a protective lens can be incorporated into the tailgate safety light(s) 32 assembly.

Figure 4:
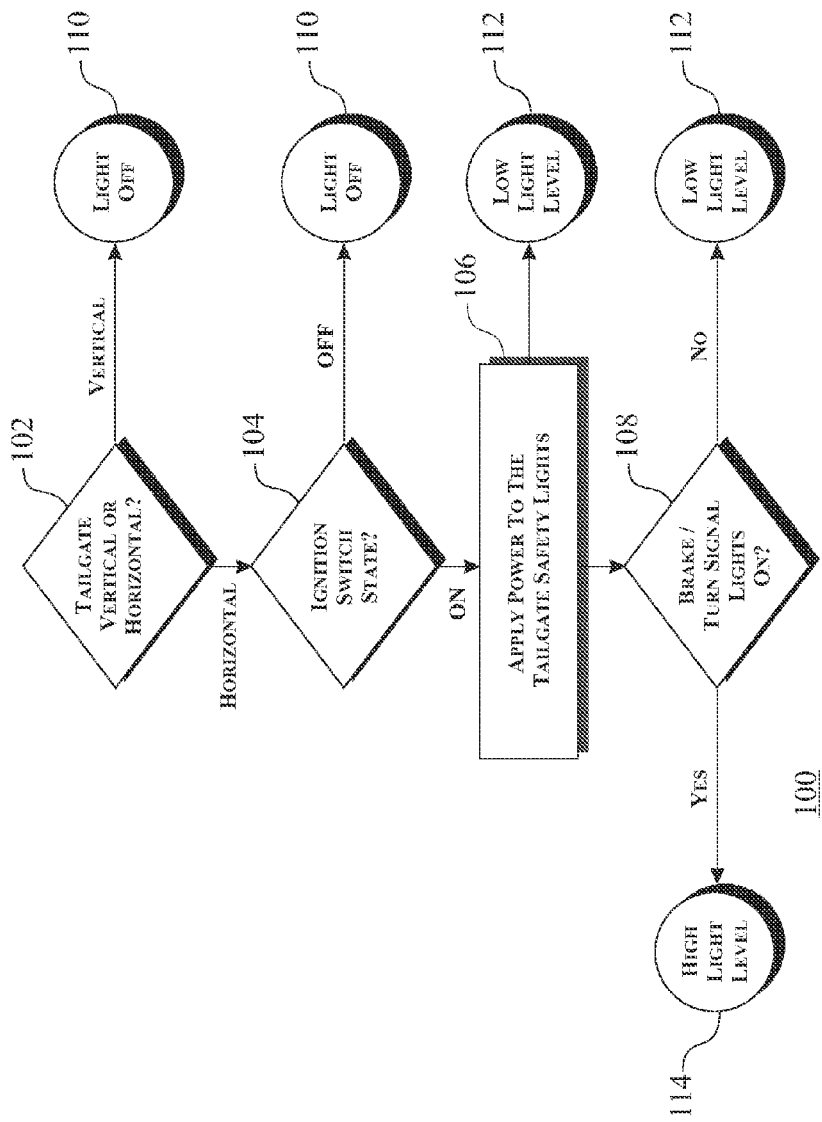
FIG. 4 presents an exemplary flow diagram presenting the functionality of the present invention.

FIG. 4 is a flow diagram presenting a method in accordance with the present invention. A tailgate safety light operational flow diagram 100 is presented. The tailgate safety light operational flow diagram 100 initiates with the apparatus incorporated into a pickup truck. The safety light system is preferably activated upon two conditions: (1) the vehicle tailgate 18 is placed in the horizontal position and (2) the user is using the vehicle. Once installed, in accordance with the first condition: the safety light system monitors the orientation of the vehicle tailgate 18 in accordance with a tailgate position decision step 102. The tailgate position decision step 102 determines whether the vehicle tailgate 18 is in a vertical (closed) or horizontal (open) position as presented in the previous figures. Such monitoring can be accomplished via any known methods of monitoring a position of a door-like object, such as a switch, a proximity sensor, a tilt sensor, a mercury switch, a weighted swivel switch, and the like. In accordance with the second condition: the safety light system monitors the state of the ignition system in accordance with an ignition switch state decision step 104. The ignition switch state decision step 104 determines if the ignition switch is turned off or on. This could simply be utilizing the ignition switch to as a switch that applies power (completes a circuit) to the tailgate safety light(s) 32. Other means can be utilized, any means known by those skilled in the art, such as relays, and the like. If either the tailgate position decision step 102 is determined to be closed/vertical or ignition switch state decision step 104 determines the ignition is in an "OFF" state, the method maintains the tailgate safety light(s) 32 in an off state in accordance with a tailgate safety light off step 110. Upon the tailgate position decision step 102 being determined to be opened/horizontal and ignition switch state decision step 104 determines the ignition being in an "ON" state, the method applies power to the tailgate safety light(s) 32, illuminating them in accordance with an application of power step 106 to the tailgate safety light(s) 32. The application of power step 106 places tailgate safety light(s) 32 in a low (normal) intensity level state in accordance with a low-level illumination state step 112. The tailgate safety light(s) 32 can optionally further comprise two levels of illumination, a low level and a high level. This, two-level lighting, allows for utilizing the tailgate safety light(s) 32 to indicate braking and/or turning. When such optional feature is incorporated, the method further comprising a high intensity requirement-monitoring step 108. The high intensity requirement monitoring step 108 is accomplished by monitoring the state of at least one of application of pressure to the braking system and activating a turn signal indicating circuit. When either of the application of pressure to the braking system or activating a turn signal indicating circuit are determined ("YES"), the tailgate safety light(s) 32 are placed in a high intensity level state in accordance with a high level illumination state step 114. Additionally, when the turn signal indicating circuit is activated, the respective (left or right) tailgate safety light(s) 32 can flash between low and high levels. When both of the application of pressure to the braking system and activating a turn signal indicating circuit are determined ("NO"), the tailgate safety light(s) 32 continue in the low (normal) intensity level state in accordance with the low level illumination state step 112.

Figure 5:
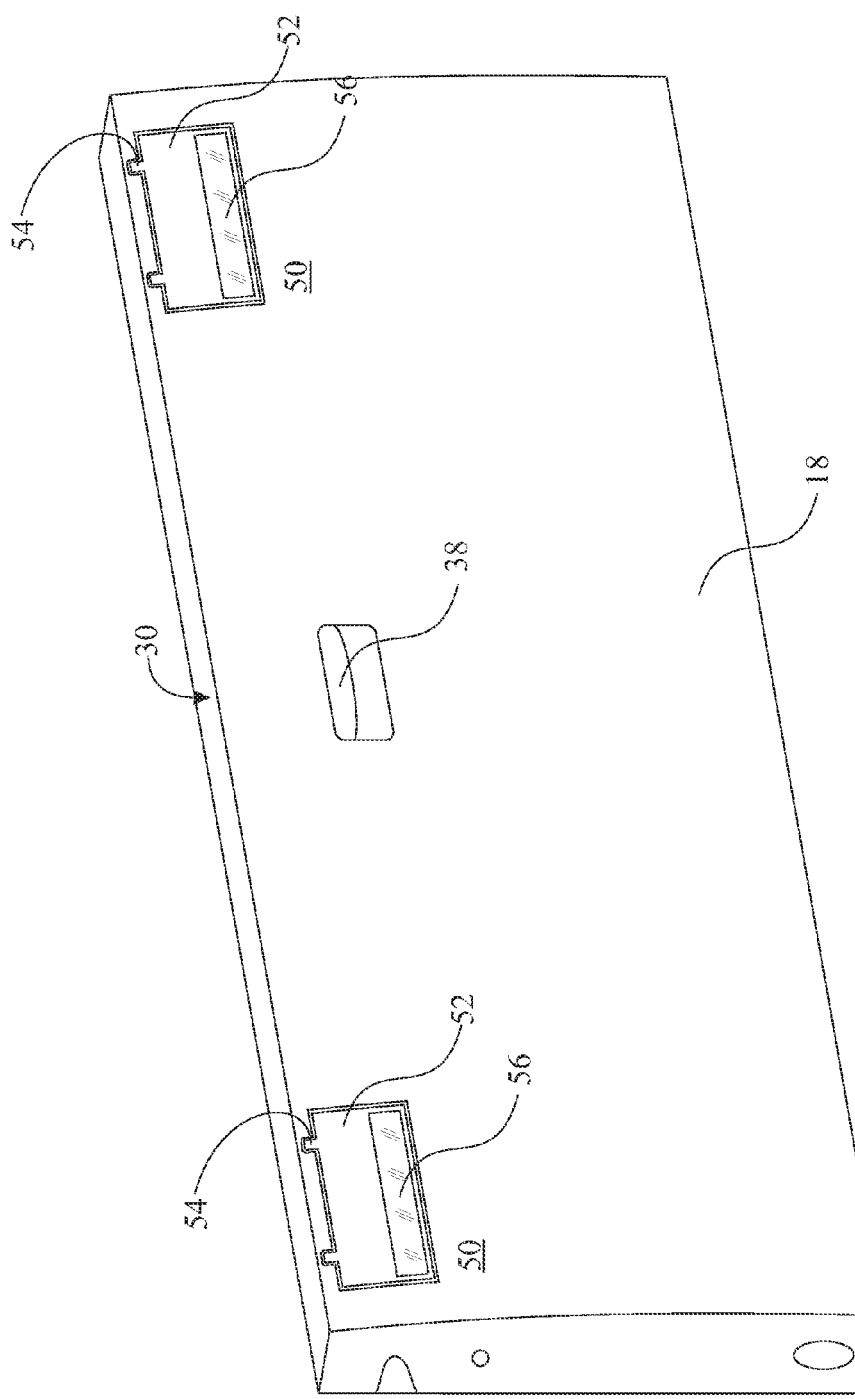
FIG. 5 presents an isometric view of the tailgate comprising a second embodiment of the present invention with the tailgate in a vertical position.

FIG. 5 is an isometric view illustrating an alternate embodiment of the present invention. The alternate embodiment presents a rotating tailgate safety light assembly 50 wherein the rotating tailgate safety light assembly 50 is integrated into a sheet metal skin of the vehicle tailgate 18. The illustration is for presentation purposes and it is recognized that the details and actual reduction to practice may differ depending upon design. The preferred design integrates the rotating tailgate safety light assembly 50 into the vehicle tailgate 18 in an aesthetically pleasing manner. One such design would combine the appearance of the rotating tailgate safety light assembly 50 and the standard taillight(s) 28, such that the two appear fluid in design. The rotating tailgate safety light assembly 50 comprising a rotating tailgate safety light frame 52 utilized to contain a rotating tailgate safety light 56. The rotating tailgate safety light assembly 50 rotates via a rotating tailgate safety light hinge 54 as illustrated in FIG. 5 herein. The rotating tailgate safety light assembly 50 can be optionally secured/released in conjunction with an operation of the tailgate handle 38/latching mechanism.

Figure 6:
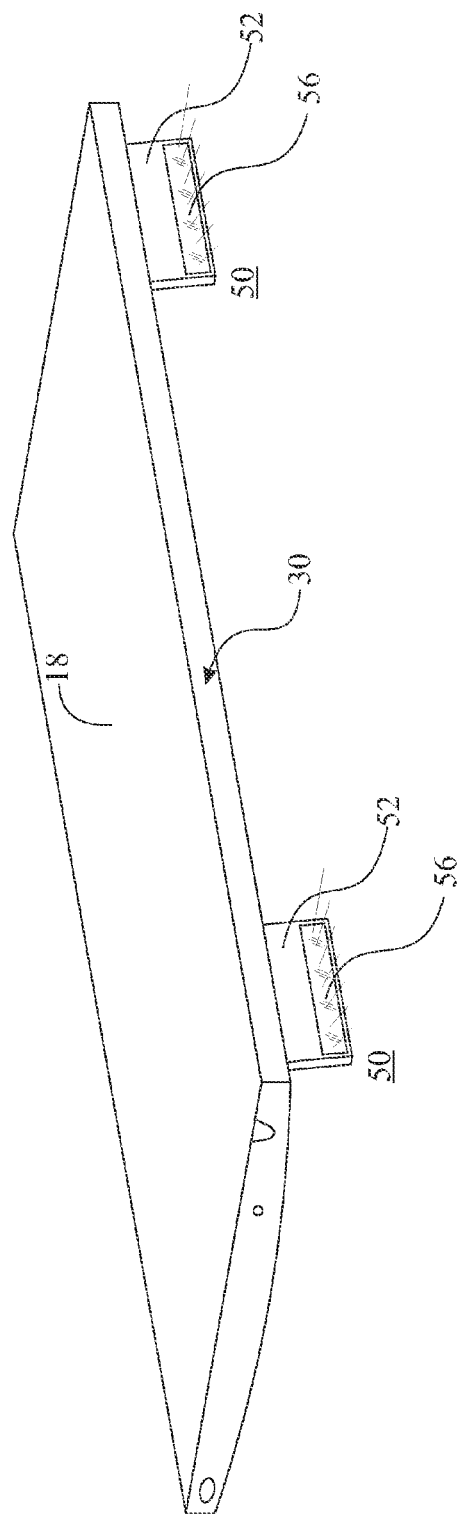
FIG. 6 presents an isometric view of the tailgate comprising the second embodiment of the present invention with the tailgate in a horizontal position.

FIG. 6 is an isometric view illustrating an alternate embodiment of the present invention, illustrating when the vehicle tailgate 18 is in the horizontal position. When the vehicle tailgate 18 is placed in the horizontal position, the rotating tailgate safety light assembly 50 rotates from a flush position to one that is generally perpendicular to the vehicle tailgate 18 or in a generally vertical position, as illustrated. This embodiment differs from the previously disclosed embodiment in that it further provides a vertical distance between the tailgate top surface 30 and the rotating tailgate safety light 56. This allows for any material that might cover the tailgate top surface 30. Alternately, this embodiment is of a higher cost and might not be as aesthetically desire-able by the consumer. While the safety light hinge 54 is clearly illustrated, it is recognized that the rotating tailgate safety light hinge 54 can be hidden, such as one similar to an automotive door hinge. It can be recognized that a switch may be utilized in conjunction with the rotating tailgate safety light assembly 50 replacing the tailgate safety light sensor 34.

Figure 7:
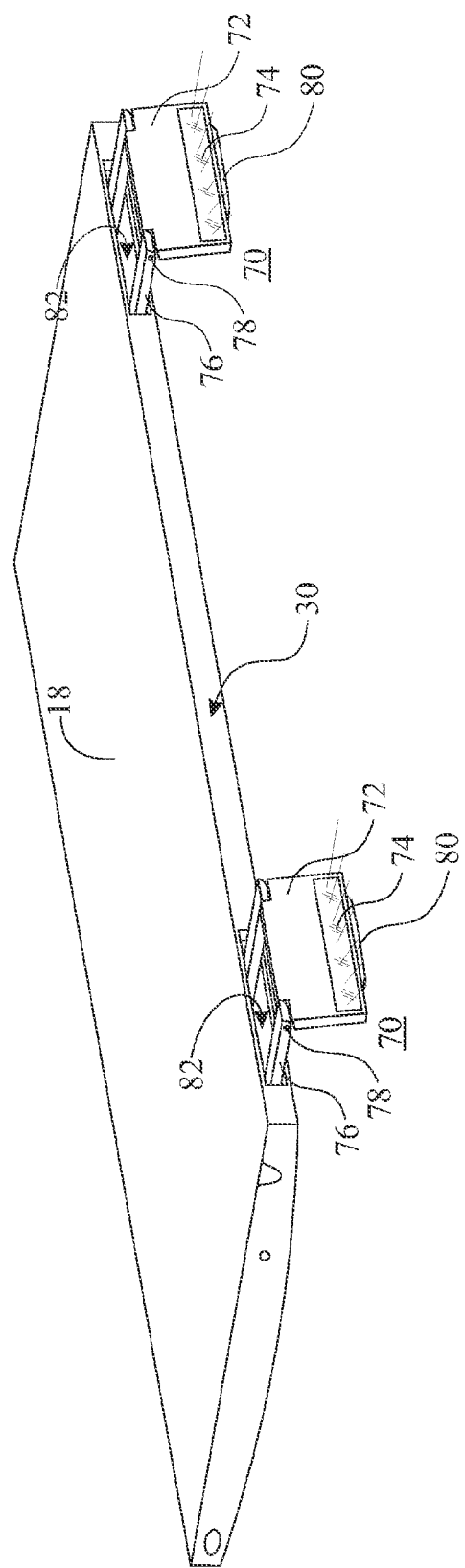
FIG. 7 presents an isometric view of the tailgate comprising a third embodiment of the present invention with the tailgate in a horizontal position.

FIG. 7 is an isometric view illustrating another embodiment of the present invention. The embodiment presents a slide-able tailgate safety light assembly 70 wherein the slide-able tailgate safety light assembly 70 is integrated into the tailgate top surface 30 utilizing a slide-able tailgate safety light pocket 82 for storing/operating the slide-able tailgate safety light assembly 70. The slide-able tailgate safety light assembly 70 comprising a slide-able tailgate safety light frame 72, which contains a slide-able tailgate safety light 74. The slide-able tailgate safety light frame 72 slides out of the a slide-able tailgate safety light pocket 82 via a slide-able tailgate safety light slide mechanism 76 and rotates into a functional orientation via a slide-able tailgate safety light hinge 78. The slide-able tailgate safety light assembly 70 optionally comprising a slide-able tailgate safety light handle 80 for aiding the user in the process of sliding out and returning of the slide-able tailgate safety light frame 72 into the slide-able tailgate safety light pocket 82. This embodiment provides an aesthetically pleasing design. This embodiment provides protection to the slide-able tailgate safety light 74. Alternatively, this embodiment requires additional effort of the user to properly position the slide-able tailgate safety light assembly 70 when desired for use. It can be recognized that a switch may be utilized in conjunction with the slide-able tailgate safety light assembly 70 replacing the tailgate safety light sensor 34.

Figure 8:
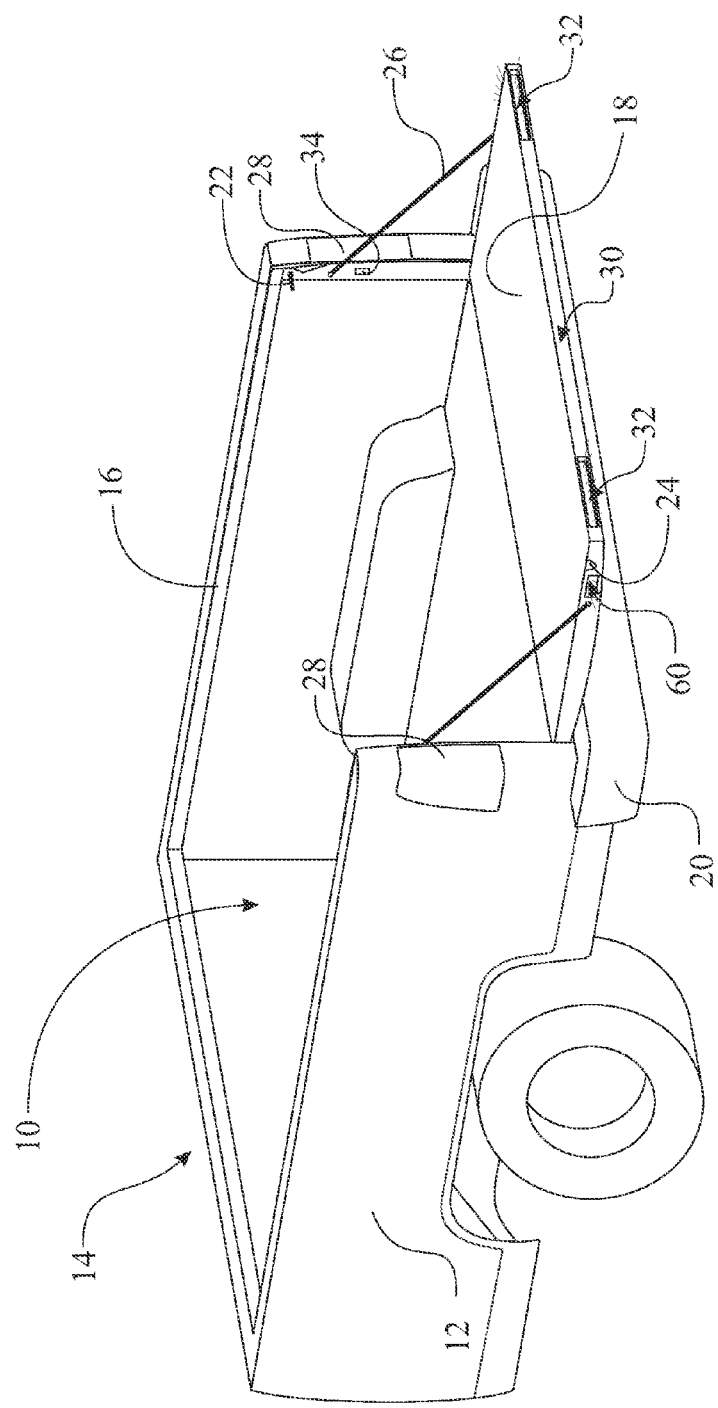
FIG. 8 presents an isometric view of the tailgate comprising tailgate side safety light.

FIG. 8 is an isometric view containing the elements of FIG. 2 and further including tailgate side safety light(s) 60. The tailgate side safety light(s) 60 are positioned on the side of the vehicle tailgate 18 providing additional visibility that the tailgate is in a lowered position to the other drivers who may be in a position traveling obliquely to the direction of the subject vehicle with the vehicle tailgate 18. The tailgate safety light(s) 32 provide visibility from the rear of the vehicle. When the tailgate safety light(s) 32 are recessed, the tailgate safety light(s) 32 fail to adequately notify drivers oblique to the vehicle that the tailgate is in a lowered position. The tailgate side safety light(s) 60 accounts for this scenario, increasing the awareness of drivers other than those directly facing the rear of the vehicle to the tailgate position.

Figure 9:
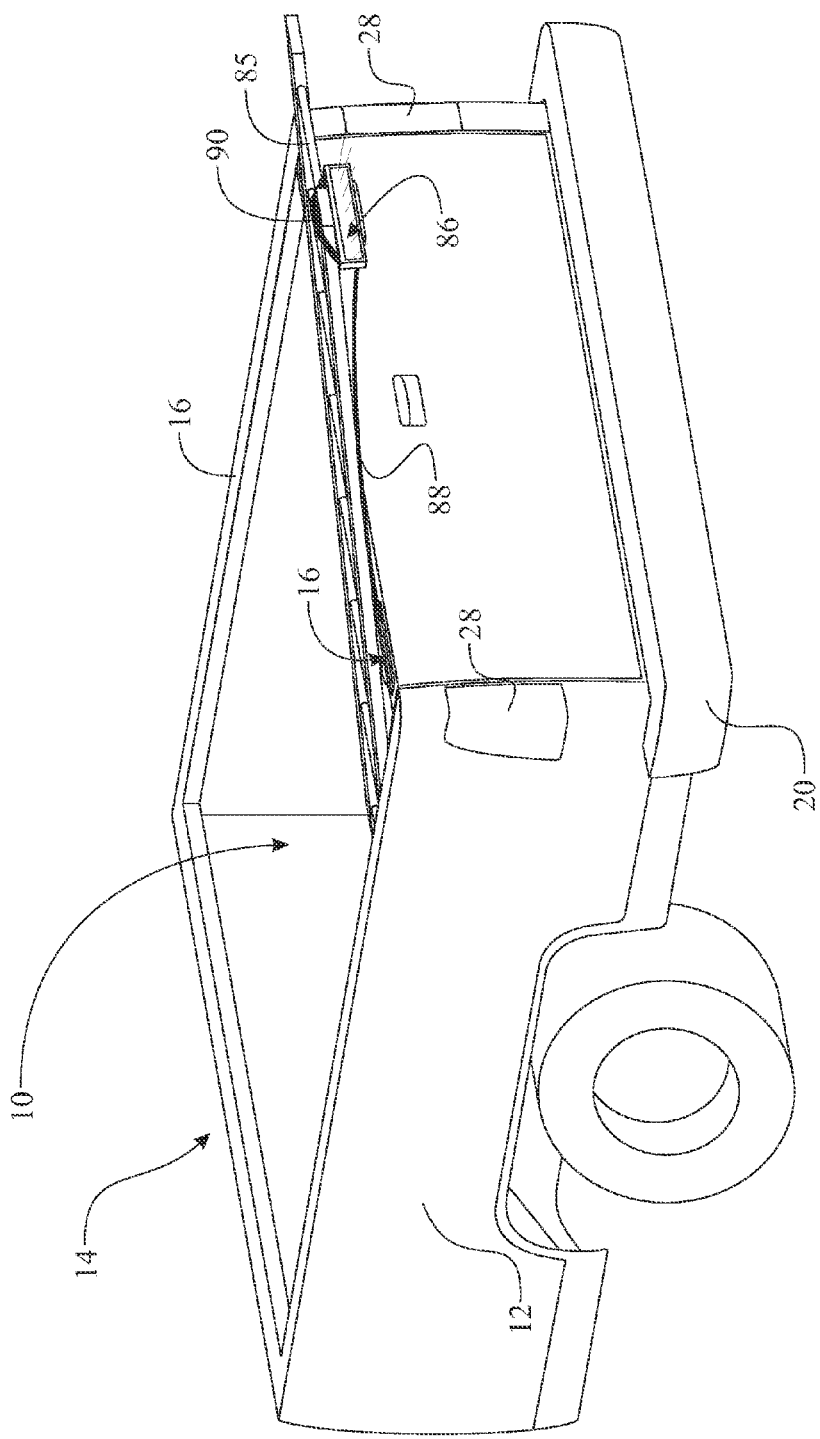
FIG. 9 presents an isometric view of a removable tailgate safety light assembly for use in conjunction with objects that extend beyond the rear edge of the pickup truck bed.

FIG. 9 is an isometric view illustrating an optional embodiment of the present invention. The optional embodiment expands the safety features of the tailgate safety light(s) 32, wherein the tailgate safety light(s) 32 are removable allowing the tailgate safety light(s) 32 to be used as a portable tailgate safety light 86. The portable tailgate safety light 86 would be coupled via a portable tailgate safety light securing mechanism 90 to an overhanging object 85 by the user. The portable tailgate safety light securing mechanism 90 can be of any known design and method, such as a strap, an elastic strap, a strap comprising dense hook and loop tape, a ribbon, magnets, hooks, ties, nails, screws, adhesive, and the like. It would be desirable that the portable tailgate safety light securing mechanism 90 is stored with the portable tailgate safety light 86. The portable tailgate safety light 86 can be powered via a retractable power cable 88 or rechargeable battery. Wherein the illustration presents the light direction being only rearward, it would be feasible that the portable tailgate safety light 86 would be designed such to provide light to multiple directions. The portable tailgate safety light 86 provides a means for replacing the red material tied to the end of an object. The portable tailgate safety light 86 ensures that the user has the signaling material available as needed. Additionally, an illuminated object draws more attention than a non-illuminated object.

Figure 10:
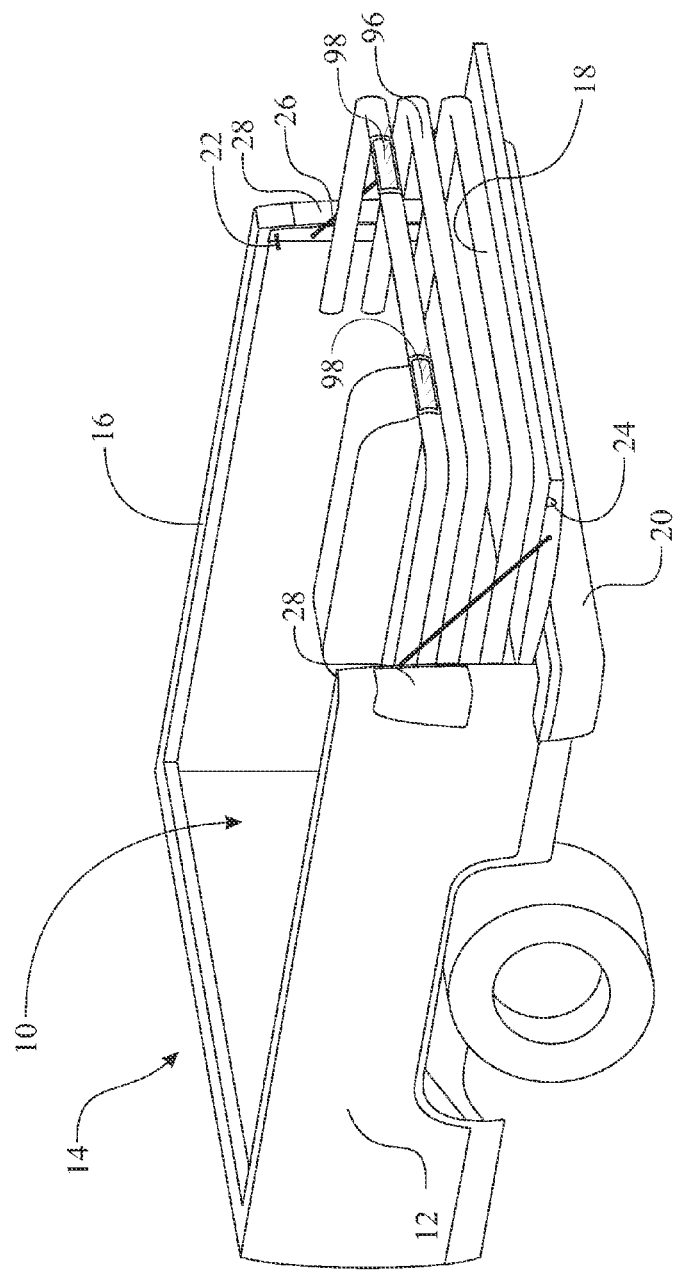
FIG. 10 presents an isometric view of one example of a tailgate bed extending apparatus incorporating a tailgate safety light assembly.

FIG. 10 illustrates an isometric view of yet another embodiment of the present invention, alternately integrating the tailgate safety light(s) 32 as tailgate extension assembly safety light(s) 98 into a tailgate extension assembly 96. The tailgate extension assembly safety light(s) 98 would comprise the same features as the tailgate safety light(s) 32 described herein. The tailgate extension assembly 96 could be the "C" shaped assembly as shown or any other of the many known assemblies for accomplishing the same means.

Figure 11:
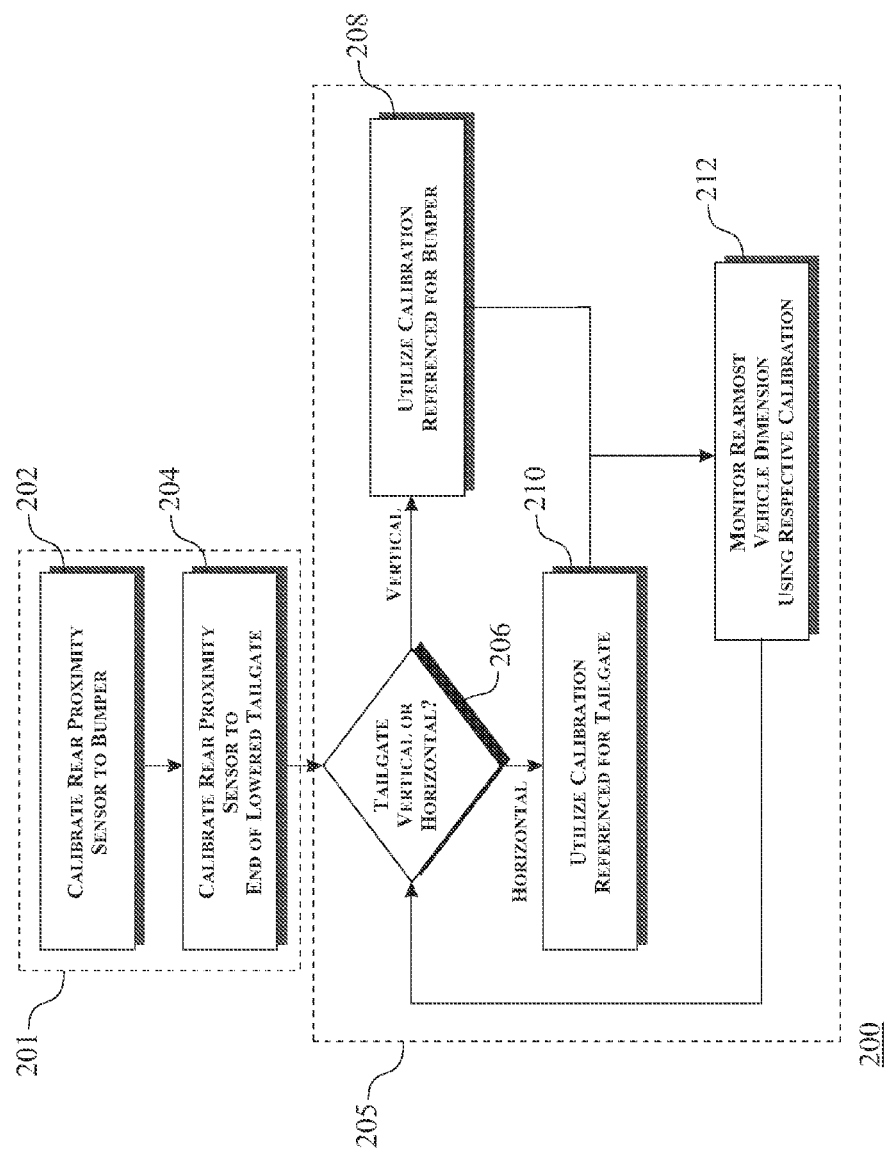
FIG. 11 presents a flow diagram illustrating the steps of distance compensating rear proximity sensors when the rear-most dimension of a vehicle changes, such as when a tailgate is lowered.

FIG. 11 is a flow diagram illustrating an additional safety feature when a vehicle tailgate 18 is placed in a horizontal orientation. The figure presents the steps of a rear proximity distance-compensating flow diagram 200. The rear proximity distance-compensating flow diagram 200 is configured in accordance with a configuration subsection 201. The configuration subsection 201 comprising a rear bumper calibration step 202 and a lowered tailgate calibration step 204. These two steps can be accomplished in any known manner and in an order respective to the method reduced to practice. The configuration subsection 201 would only be required upon initial installation or a calibration reset scenario of the rear proximity sensor system. Upon completion of the configuration subsection 201, the multiple calibration proximity sensing method progresses into a general operation subsection 205. The general operation subsection 205 comprising the steps in which the method would function during its day-to-day practice. The general operation subsection 205 monitors the orientation of the vehicle tailgate 18. A tailgate orientation decision step 206 utilizes a tailgate orientation sensor (see 236 of FIG. 13) to determine the orientation of the vehicle tailgate 18. When determined that the vehicle tailgate 18 is in a vertical (closed) position, the multiple calibration proximity sensing method utilizes a calibration referenced to the bumper in accordance with a bumper referenced calibration utilization step 208. When determined that the vehicle tailgate 18 is in a horizontal (open) position, the multiple calibration proximity sensing method utilizes a calibration referenced to the tailgate top surface 30 in accordance with a tailgate referenced calibration utilization step 210. Once the system has the calibration respective to the orientation of the tailgate assembly, the multiple calibration proximity sensing method monitors the distance from an object behind the vehicle and what is determined to be the rearmost position of the vehicle in accordance with a rear proximity distance monitoring step 212. The rear proximity distance monitoring step 212 is repeated until there is a change in the result of the tailgate orientation decision step 206. The rear proximity distance-compensating flow diagram 200 can be applied to any hinged or sliding object that changes the rearmost position of a vehicle. The implementation of the multiple calibration proximity sensing method can be implemented by those skilled in the art using any known tailgate orientation sensing mechanism, software for compensating for the calibration, and known proximity sensing technology.

Figure 12:
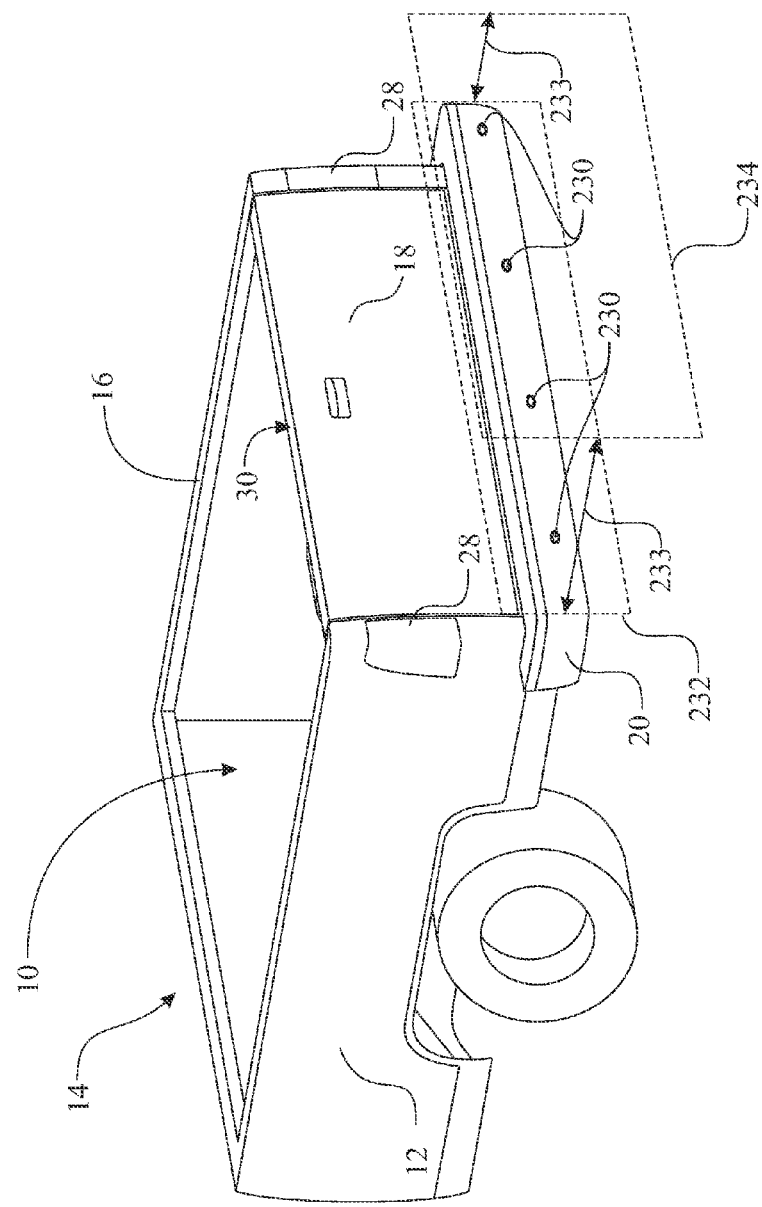
FIG. 12 presents an isometric view illustrating a distance compensating rear proximity sensor system, wherein the tailgate is in a closed position.
Figure 13:
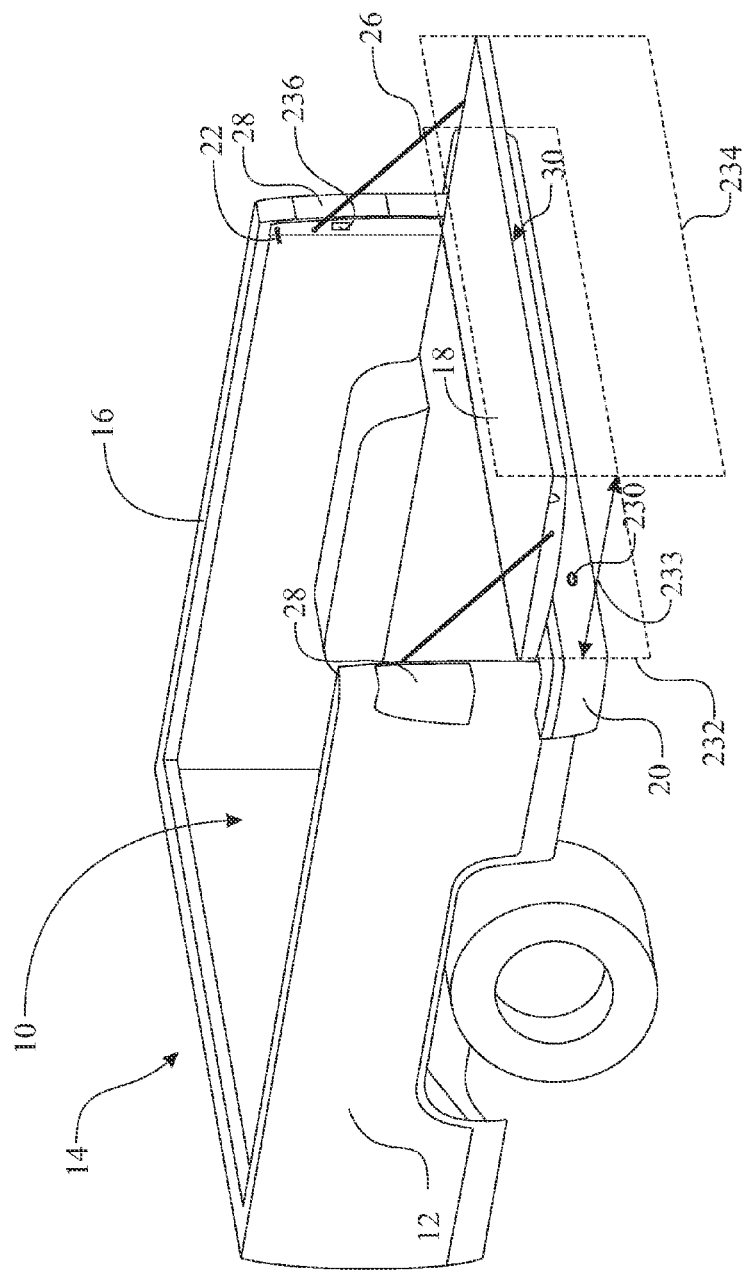
FIG. 13 presents an isometric view illustrating a distance compensating rear proximity sensor system, wherein the tailgate is in an open position.

FIGS. 12 and 13 present an isometric view of a multiple calibration proximity sensing apparatus respective to the method presented in FIG. 11. The figure illustrates the resultant of the tailgate orientation decision step 206 being the vehicle tailgate 18 oriented vertically (closed). The vehicle comprising a plurality of rear proximity sensor(s) 230 incorporated in the rear bumper 20. When the vehicle tailgate 18 is closed, the multiple calibration proximity sensing apparatus is calibrated to use a bumper proximity plane 232 as the rearmost plane of the vehicle. When the vehicle tailgate 18 is open, the multiple calibration proximity sensing apparatus is calibrated to use a tailgate proximity plane 234 as the rearmost plane of the vehicle. The proximity plane change 233 is the distance between the bumper proximity plane 232 and tailgate proximity plane 234. Without the multiple calibration proximity sensing apparatus, the standard rear proximity sensing system would not consider the proximity plane change 233, allowing the user to damage the vehicle tailgate 18. It is further recognized that the plurality of rear proximity sensor(s) 230 cannot be oriented to monitor objects located looking vertically between the vehicle and the ground. This limits the application of the plurality of rear proximity sensor(s) 230. Alternatively, one can deploy heat sensors that will identify objects such as children and animals that might stray under the vehicle.

Alternately, one can place rear proximity sensors along the tailgate top surface 30. One drawback of this alternative is the cost increase. A second drawback is the potential for damage to the rear proximity sensors along the tailgate top surface 30.

Figure 14:
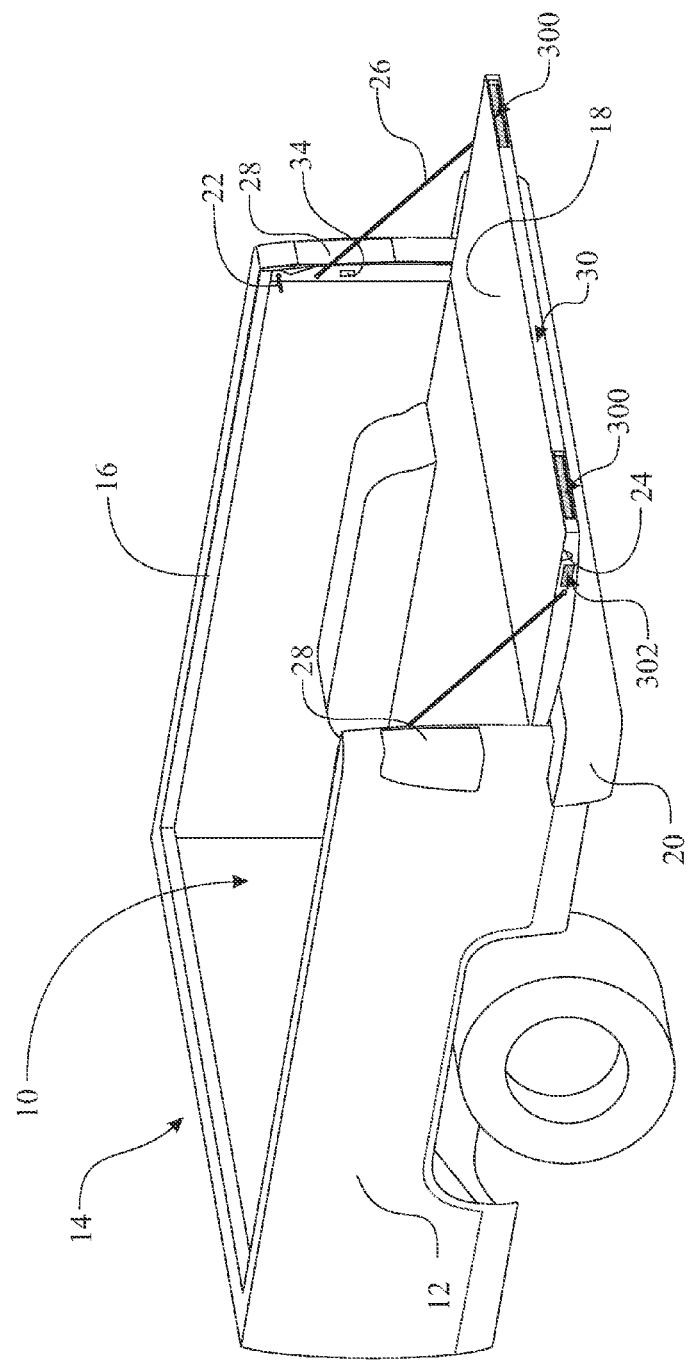
FIG. 14 presents an isometric view illustrating an alternate embodiment of the present invention, utilizing reflective material.

FIG. 14 illustrates a isometric view of the Pickup Truck bed, presenting an alternate embodiment of the present invention, wherein the tailgate safety light(s) 32 and optional tailgate side safety light(s) 60 comprise a reflective medium, thus becoming a tailgate safety reflector medium 300 and a tailgate side safety reflector medium 302 respectively. It would be desirable for the tailgate safety reflector medium 300 to be placed in a recess of the tailgate top surface 30 to minimize damage and wear to the reflective medium. The reflective medium can be of any color, preferably meeting any legal requirements. Such requirements may include a color of red, visible at night from all distances within 600 feet to 100 feet to the rear when directly in front of lawful lower beams of headlamps. The preferred location would be to indicate maximum width of the vehicle tailgate 18. The tailgate side safety reflector medium 302 would preferably be sized such and positioned on each side of the vehicle tailgate 18, the tailgate side safety reflector medium 302 being red and visible from a distance of at least 500 feet to the side and located at a position proximate the tailgate top surface 30.

Figure 15:
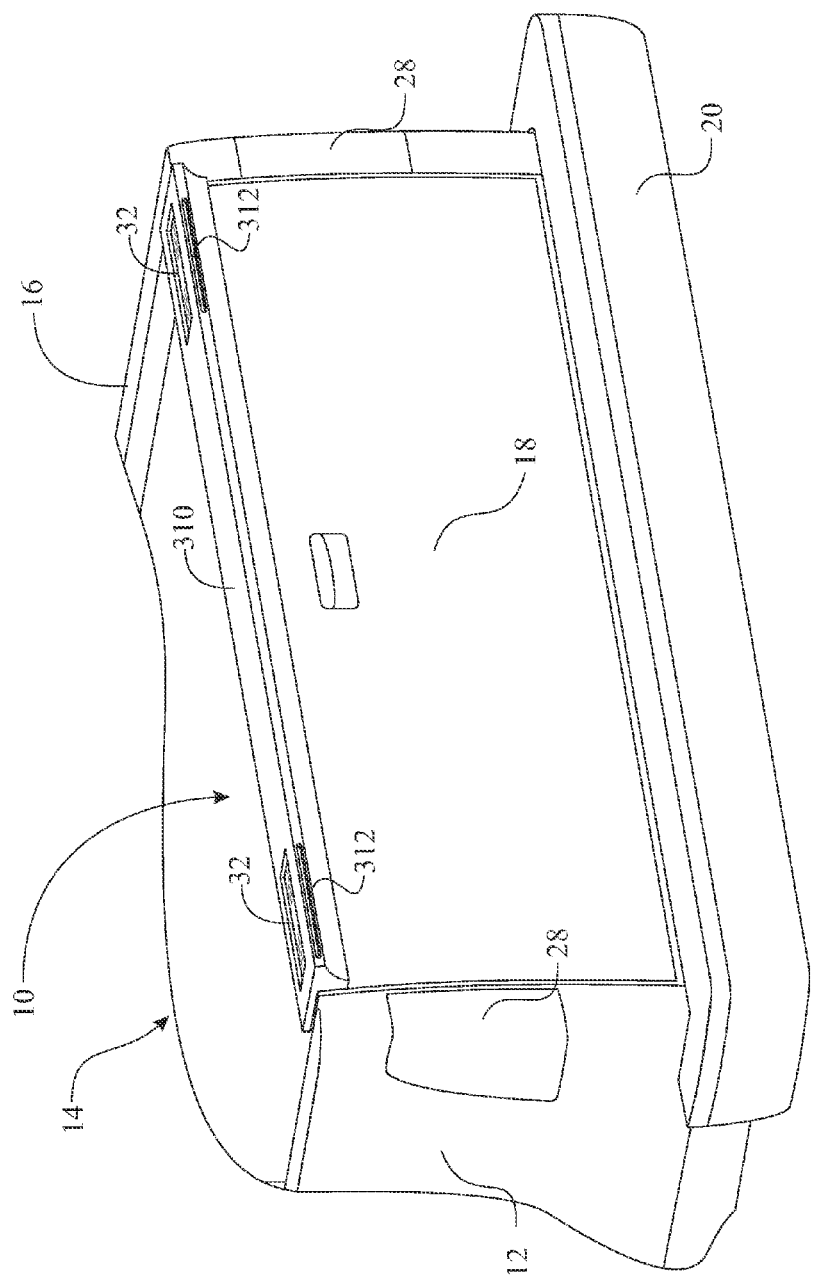
FIG. 15 presents an isometric view illustrating another alternate embodiment of the present invention, positioning the safety lights within a tailgate protective cover.

FIG. 15 presents another alternate embodiment of the present invention, wherein the tailgate safety light(s) 32 are assembled into a tailgate protective top cover 310. Additionally, the figure illustrates another aspect of the present invention; presenting a tailgate rearview safety light 312. The tailgate rearview safety light 312 can be the same illumination source as the tailgate safety light(s) 32, or a different illumination source. The function of the tailgate rearview safety light 312 would be either simple illumination or consistent with the standard taillight(s) 28. It is recognized that although not as desirable, a reflective medium could be used as an alternative to an illumination source. The tailgate protective top cover 310 can be provided as an OEM assembly or an aftermarket assembly.

Figure 16:
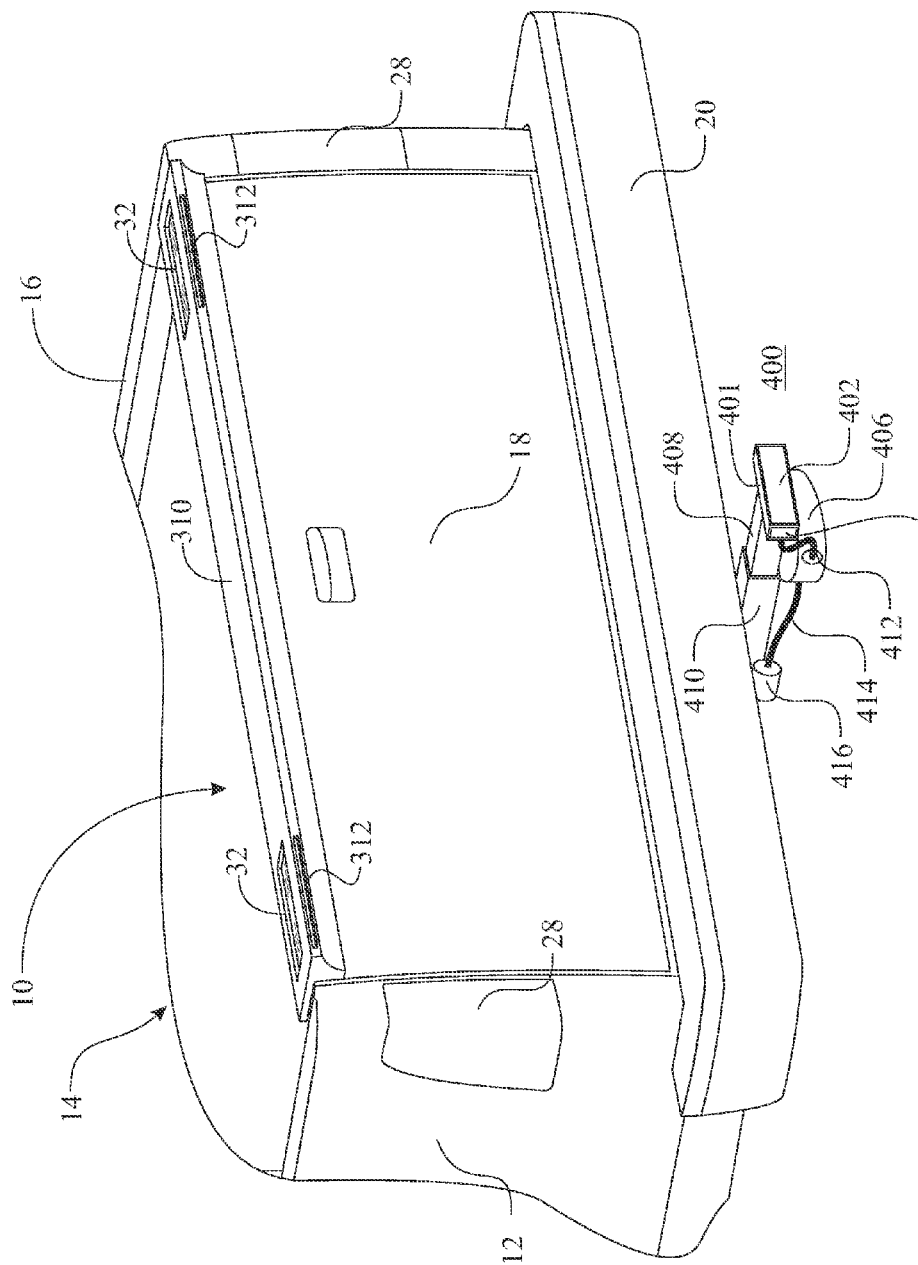
FIG. 16 presents an isometric view of an exemplary alternative embodiment of the pullout safety light, shown in a stored position.

FIG. 16 presents an isometric view of an alternate embodiment to the portable tailgate safety light 86 of FIG. 9, wherein the alternate embodiment is a removable trailer hitch projection light assembly 400. The removable trailer hitch projection light assembly 400 comprising a removable light assembly 401. The removable light assembly 401 comprising an enclosure, which presents a primary angle viewing safety taillight 402 and optional secondary angle viewing safety taillight 404. Power is supplied to the removable light assembly 401 via a removable light power cable 412. The removable light power cable 412 is retractable and retracts into via a retractable cord mechanism 406. The removable light assembly 401 and retractable cord mechanism 406 can be assembled to a mounting member 408. The mounting member 408 is preferably designed to couple to a trailer hitch receptacle 410. Power is supplied to the removable trailer hitch projection light assembly 400 via a power supply cable 414, the power supply cable 414 is preferably designed to electro-mechanically couple with a trailer hitch light control connector 416. This power source configuration provides an illumination sequence to the removable light assembly 401 concurrent with the illumination of the standard taillight(s) 28. This illustration presents the removable trailer hitch projection light assembly 400 in a stored state. In a slightly modified version, the power can be provided to rechargeable batteries 430 in conjunction with a recharging circuit, thus eliminating the removable light power cable 412 and the retractable cord mechanism 406. Charging power would be provided to the removable light assembly 401 via a detachable cable extending between the trailer hitch light control connector 416 and the safety light assembly receptacle 450. An electrical connection would be employed between the removable light assembly 401 and the safety light assembly receptacle 450 by a pair of mating electrical connectors (not shown, but well understood). Should it be desirable to provide lighting concurrent with the standard taillight(s) 28, wireless communications can be utilized. Several low power examples include Bluetooth, Zigbee, and the like. There are pros and cons for each embodiment and the reduction to practice should be that of designer's choice; not limiting the spirit and intent of the present invention.

Figure 17:
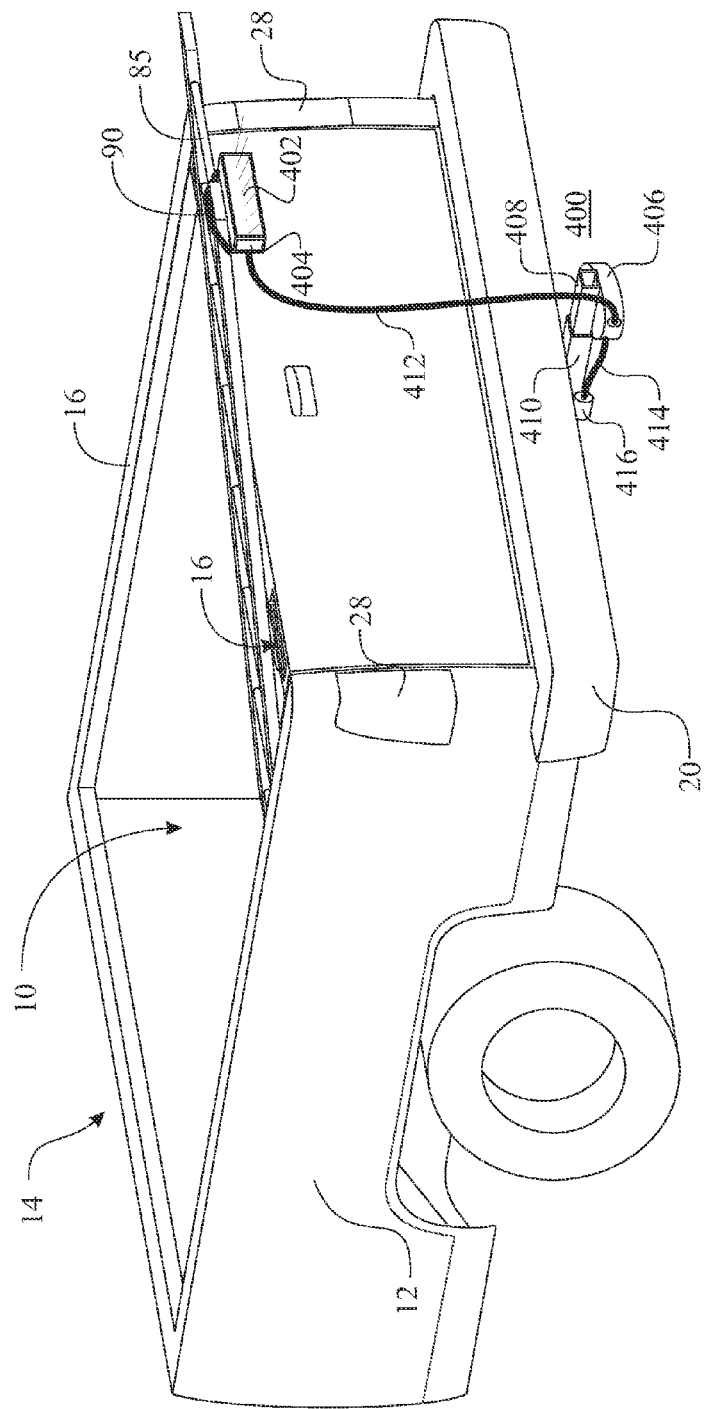
FIG. 17 presents an isometric view of the alternate embodiment for the pullout safety light, shown in an in-use position.

FIG. 17 illustrates the removable trailer hitch projection light assembly 400 in an in-use state. The removable light assembly 401 is coupled to the overhanging object 85 via the portable tailgate safety light securing mechanism 90. It would be desirable wherein the portable tailgate safety light securing mechanism 90 is stored within the mounting member 408 when not in use. There are many designs providing the user with a removable light assembly 401 that can be removably coupled to the mounting member 408.

Figure 18:
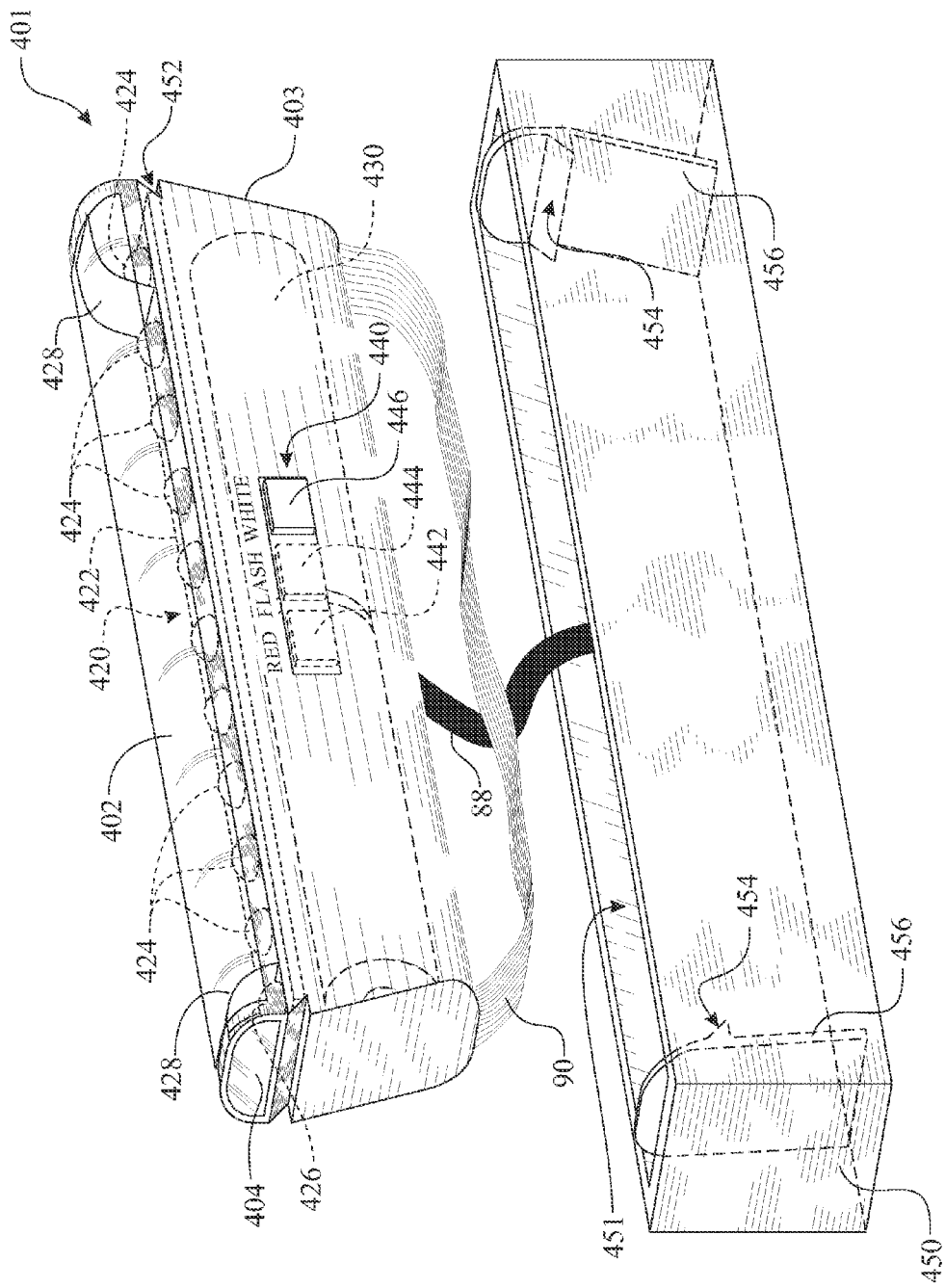
FIG. 18 presents an isometric enlarged view of the pullout safety light illustrating additional operational details.

FIG. 18 presents a more detailed illustration of the removable light assembly 401. The removable light assembly 401 comprising a removable light assembly housing 403 having a primary angle viewing safety taillight lens 402 attached to an elongated longitudinal end of the housing 403 and at least one optional secondary angle viewing safety taillight lens 404 attached to at least one lateral end of the housing 403. The primary angle viewing safety taillight lens 402 would emit a red light along the length of the removable light assembly 401 to function as a warning light in accordance with any state or national laws. The optional secondary angle viewing safety taillight(s) 404 are positioned on each side of the removable light assembly 401 to emit a white light therefrom for use as a flashlight. The removable light assembly 401 would comprise of at least one light 424, 426 positioned within the enclosure. One embodiment, a light emitting subassembly 420 would include a series of LED's 424, 426 assembled to a circuit assembly 422. The LED's 424, 426 would illuminate and be visible through the primary angle viewing safety taillight lens 402 as well as the secondary angle viewing safety taillight lens 404. The color would be consistent with any legal directives. The color can be provided via either a colored lens 404, colored illumination source 424, 426, or both. A light deflector 428 can be integrated into the removable light assembly 401 to direct the white illuminating light towards the secondary angle viewing safety taillight lens 404, ensuring the removable light assembly 401 illuminates in accordance with the desired function. The removable light assembly 401 can include a series of red light emitting devices 424 spatially arranged along the printed circuit assembly 422. The red light emitting device 424 can either emit red light or the combination of the white emitting lights 424 with a red tinted primary angle viewing safety taillight lens 402 can be utilized to provide a red light emitted from the extended longitudinal surface of the removable light assembly 401. A white light emitting device 426 is preferably provided at each end of the printed circuit assembly 422 to provide a white emitted light. To ensure the white emitted light does not project rearward, the white light emitting device 426 can be assembled to the opposite side of the printed circuit assembly 422, a light deflector 428 can be employed to adequately direct the emitted white light towards the secondary angle viewing safety taillight lens 404, and the like.

Manual operation of the removable light assembly 401 can be provided by operational control subassembly 440. The operational control subassembly 440 would include at least one user control interface, such as a button, a slide switch, a toggle switch, and the like, to direct operation thereof. The exemplary embodiment includes a series of three buttons: a continuous red control 442 for directing emission of a continuous red light from the extended longitudinal surface of the removable light assembly 401, a flashing red control 444 for directing emission of a flashing red light from the extended longitudinal surface of the removable light assembly 401, and a continuous white control 446 for directing emission of a continuous red light through the secondary angle viewing safety taillight lens 404 at either or both ends of the removable light assembly 401.

The removable light assembly 401 can be provided in electrical signal communication with trailer hitch light control connector 416 to extend vehicle lighting thereto. A series of red light emitting devices 424 can be spatially arranged along the printed circuit assembly 422 enabling a sequential pattern of lighting to indicate a turn signal. The complete series of red light emitting devices 424 can illuminate to indicate braking. The red light emitting device 424 can include a bi-level illumination to allow for driving lights at a lower illumination level and braking at a higher illumination level. Alternatively, the light emitting subassembly 420 can illuminate a portion of the series of red light emitting devices 424 to present a lower illumination intensity level for driving lights and a larger portion or all of the series of red light emitting devices 424 to present a higher illumination intensity level to indicate a braking condition.

The removable light assembly 401 can be coupled via a safety light assembly receptacle 450. The safety light assembly receptacle 450 comprising a safety light assembly receiving cavity 451, wherein the removable light assembly 401 is placed when stored. The removable light assembly 401 is removably coupled to the safety light assembly receptacle 450 via an interface between a safety light coupling recess 452 and a safety light coupling clip 454. The safety light coupling clip 454 is integrated with a safety light coupling clip spring 456, wherein the safety light coupling clip 454 can be positioned to secure or release the removable light assembly 401 respective to the safety light assembly receptacle 450. The safety light assembly receptacle 450 can be coupled to the mounting member 408, integrated into the vehicle tailgate 18, or any other vehicle mounting design. Additionally illustrated is the storage of the retractable power cable 88/removable light power cable 412 and the portable tailgate safety light securing mechanism 90. The retractable power cable 88/removable light power cable 412 would retract through the safety light assembly receptacle 450. The portable tailgate safety light securing mechanism 90 would be stored within the safety light assembly receiving cavity 451 of the safety light assembly receptacle 450.

Figure 19:
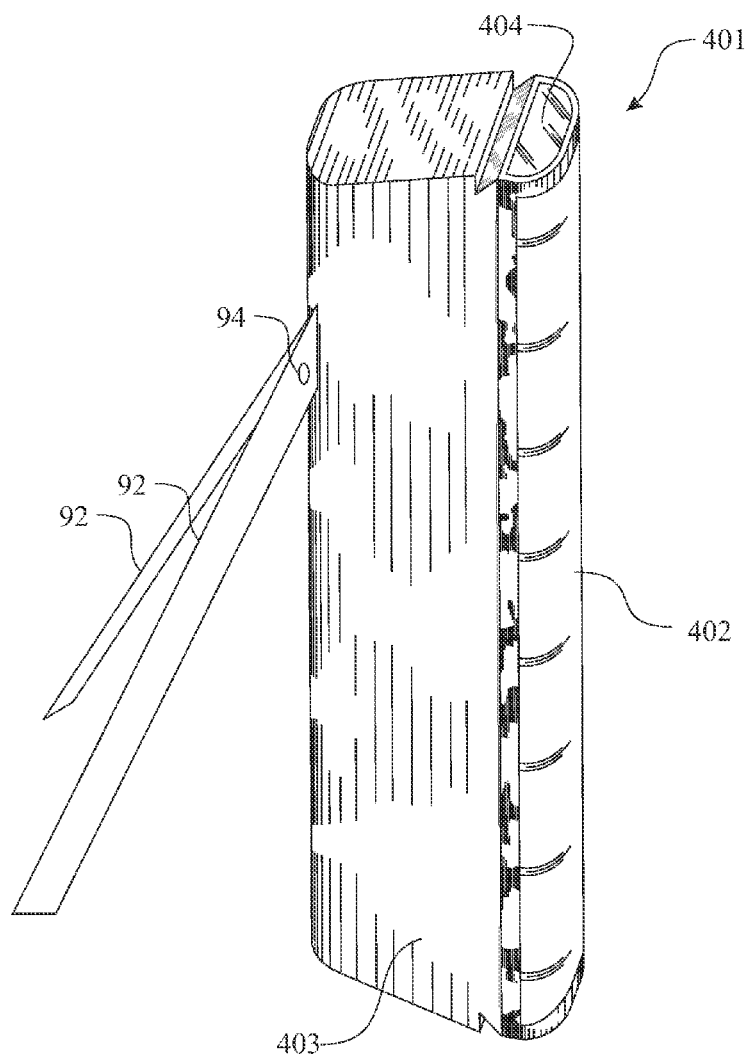
FIG. 19 presents an isometric enlarged view of the pullout safety light introducing leg supports to configure the safety light into a roadside flare.

FIG. 19 introduces features to convert the removable light assembly 401 into a roadside flare or a spot light. The removable light assembly 401 can include one or more safety light support legs 92 to retain the removable light assembly 401 in an upright configuration for use as a roadside flare, a spot light, and the like. The safety light support legs 92 can be assembled to the removable light assembly housing 403 using any convertible mechanism enabling the safety light support legs 92 to transition between a stored configuration and a deployed configuration. The exemplary embodiment presents a support legs pivot 94, enabling the safety light support legs 92 to rotate between the stored configuration and the deployed configuration.

Figure 20:
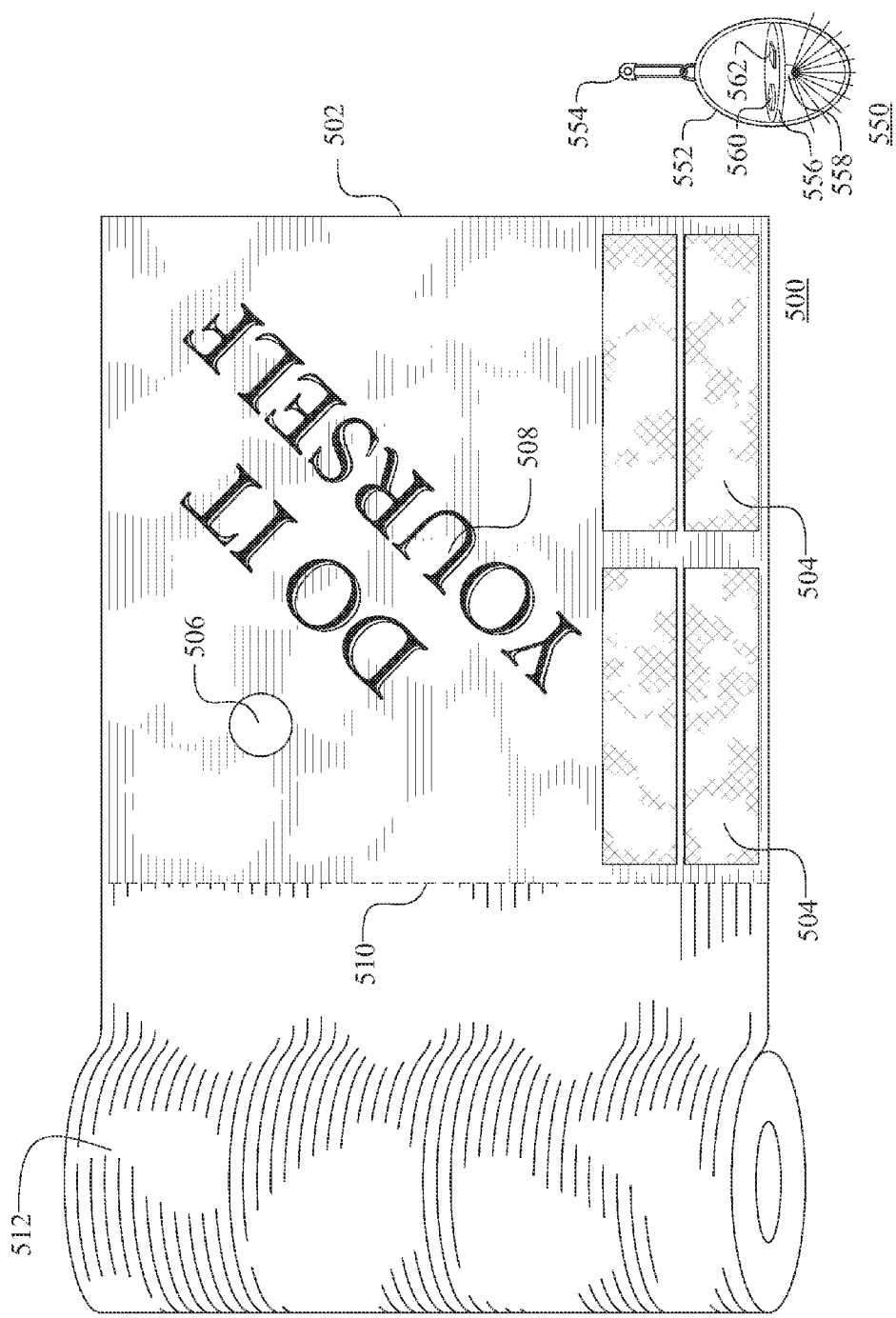
FIG. 20 presents an exemplary red flag having removable reflector tape sections.

FIG. 20 introduces yet another safety feature for objects projecting from a vehicle. The illustration introduces a projecting object warning flag and reflective material 500, wherein the projecting object warning flag and reflective material 500 comprising a projecting flag material 502. The projecting flag material 502 is preferably presented off a plurality of projecting object warning flag and reflective material 500 placed in a rolled plurality of warning flags 512. The projecting flag material 502 can be of any flexible type material, including plastic, nylon, fabric, and the like. Additionally, the projecting flag material 502 can be made reflective. The projecting object warning flag and reflective material 500 is separated from the rolled plurality of warning flags 512 by the inclusion of perforations 510. The projecting flag material 502 is of a legally colored material (generally red) for use as a red flag that is tied to an object that is projecting from a vehicle. The projecting object warning flag and reflective material 500 further comprising a projecting flag securing aperture 506 placed within the projecting flag material 502, wherein the projecting flag securing aperture 506 is provided to assist in securing the projecting object warning flag and reflective material 500 to the projecting object. The projecting object warning flag and reflective material 500 further comprising at least one removable reflective material 504, preferably four (4) pieces of the removable reflective material 504. This provides sufficient material for the legal requirements of a reflective material on the rear of a projecting object to show the width of the projecting object as well as on each side of the projecting object. The removable reflective material 504 would preferably be a reflective material with an adhesive backing, wherein the removable reflective material 504 would be removed from the projecting object warning flag and reflective material 500 and adhered to the projecting object. The projecting flag material 502 would then be secured to the projecting object such as by tying the projecting flag material 502 using the projecting flag securing aperture 506. Alternatively, the projecting object warning flag and reflective material 500 can be coupled to the projecting object include a dense hook and loop tape, magnets, tie handles, and the like. The projecting object warning flag and reflective material 500 could optionally include advertisement(s) 508, such as the name/logo of the hardware supply store. It would be more desirable wherein the advertisement(s) 508 are of a color contrasting, reflective material applied to the projecting flag material 502.

An optional warning flag illumination ornament 550 can be provided to the customer, wherein the warning flag illumination ornament 550 comprising a warning flag illumination ornament coupler 554 to couple the warning flag illumination ornament 550 to the projecting object warning flag and reflective material 500. The warning flag illumination ornament 550 comprising a warning flag illumination ornament enclosure 552. A warning flag illumination ornament circuit assembly 556 comprising a warning flag illumination power source 560, a warning flag illumination controller 562, and a warning flag illumination apparatus 558, collectively providing a portable illumination source is placed within the warning flag illumination ornament enclosure 552. The warning flag illumination apparatus 558 can be an LED, an incandescent bulb, and the like. The LED is preferred as it is less susceptible to damage by shock and vibration as well as being a lower power drain. To further ensure longevity, the illumination source can be potted or molded into a support material. The warning flag illumination power source 560 can be activated by storing with a non-conductive material (not shown) positioned in a manner to avoid conductivity between a circuit and a terminal of the warning flag illumination power source 560. To activate the warning flag illumination ornament 550, the user would remove the non-conductive material. The warning flag illumination ornament 550 can further comprise circuitry to flash the warning flag illumination apparatus 558.

Figure 21:
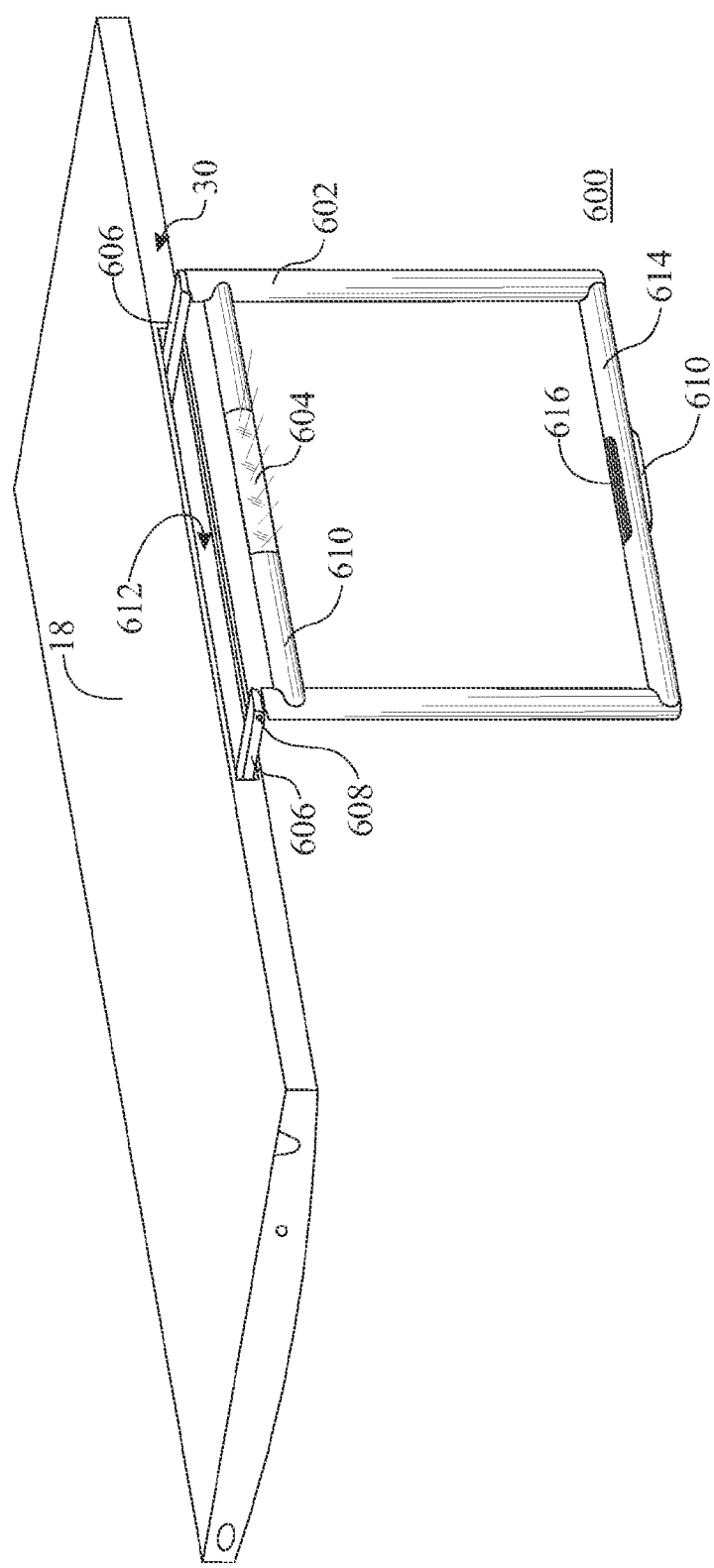
FIG. 21 presents an isometric view of an exemplary slide-able, pullout tailgate step illustrated in a deployed configuration.

FIG. 21 is an isometric view of a slide-able tailgate step & safety light assembly 600; wherein the slide-able tailgate step & safety light assembly 600 is stored within the vehicle tailgate 18. The slide-able tailgate step & safety light assembly 600 pulls out of a slide-able tailgate step pocket 612 within the tailgate top surface 30. The slide-able tailgate step & safety light assembly 600 comprising a number of components. A slide-able tailgate step & safety light frame 602 is coupled to the vehicle tailgate 18 via a slide-able tailgate safety light slide mechanism 606. The slide-able tailgate step & safety light frame 602 is coupled to the slide-able tailgate safety light slide mechanism 606 via a slide-able tailgate safety light hinge 608, preferably incorporating a locking mechanism (not shown) wherein the locking mechanism secures the slide-able tailgate step & safety light frame 602 in a substantially vertical orientation. The slide-able tailgate step & safety light frame 602 comprising a slide-able tailgate step 614, wherein the slide-able tailgate step 614 provides a step to aid a person in climbing into the bed of a truck. To ensure safety, a slide-able tailgate step grip section 616 can be coupled to the slide-able tailgate step 614. The slide-able tailgate step grip section 616 can be a grip adhesive strip applied onto the slide-able tailgate step 614, a secondary member mechanically coupled to the slide-able tailgate step 614, simply a texturing applied to the slide-able tailgate step 614, and the like. A slide-able tailgate step handle 610 can optionally be included to assist the user in pulling the slide-able tailgate step & safety light assembly 600 out of a slide-able tailgate step pocket 612.

Figure 22:
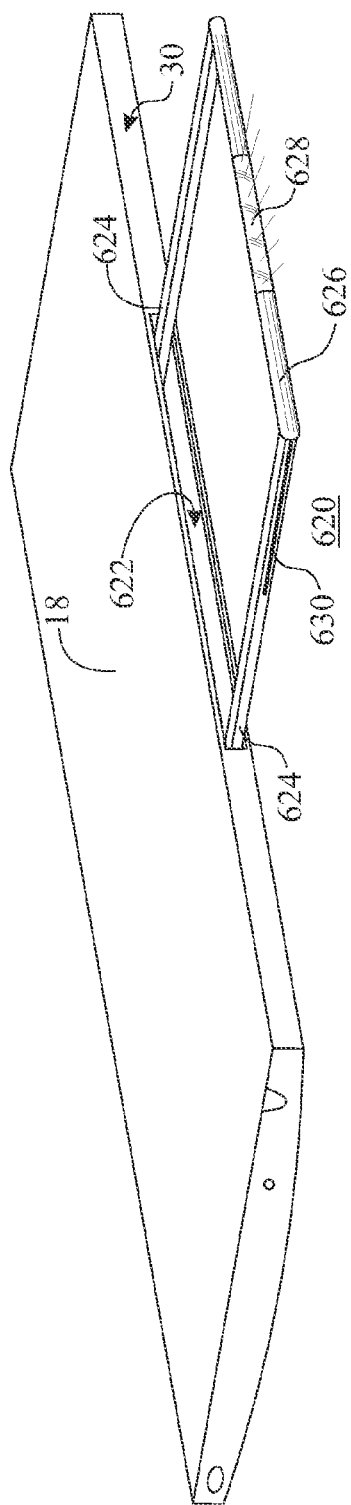
FIG. 22 presents an isometric view of the slide-able, pull-out tailgate step illustrated in a partially extended configuration.

FIG. 22 is an isometric view of a slide-able tailgate extension & safety light assembly 620; wherein the slide-able tailgate extension & safety light assembly 620 is stored within the vehicle tailgate 18. The slide-able tailgate extension & safety light assembly 620 pulls out of a slide-able tailgate extension pocket 622 within the tailgate top surface 30. The slide-able tailgate extension & safety light assembly 620 comprising a number of components. The slide-able tailgate extension & safety light assembly 620 comprising a slide-able tailgate extension & safety light frame 624 and a slide-able tailgate extension & safety light support bar 626. A slide-able tailgate extension safety light 628 is integrated into the slide-able tailgate extension & safety light support bar 626. The slide-able tailgate extension safety light 628 would illuminate upon any number of scenarios: when the tailgate is lowered, when the slide-able tailgate extension & safety light assembly 620 is placed in an extended position, when the vehicles parking/driving lights are illuminated and the like. Alternately, a reflective material can be used providing similar, although slightly less effective results. A reflective frame side indicator 630 can be utilized, wherein the reflective frame side indicator 630 is preferably a reflective tape.

Figure 23:
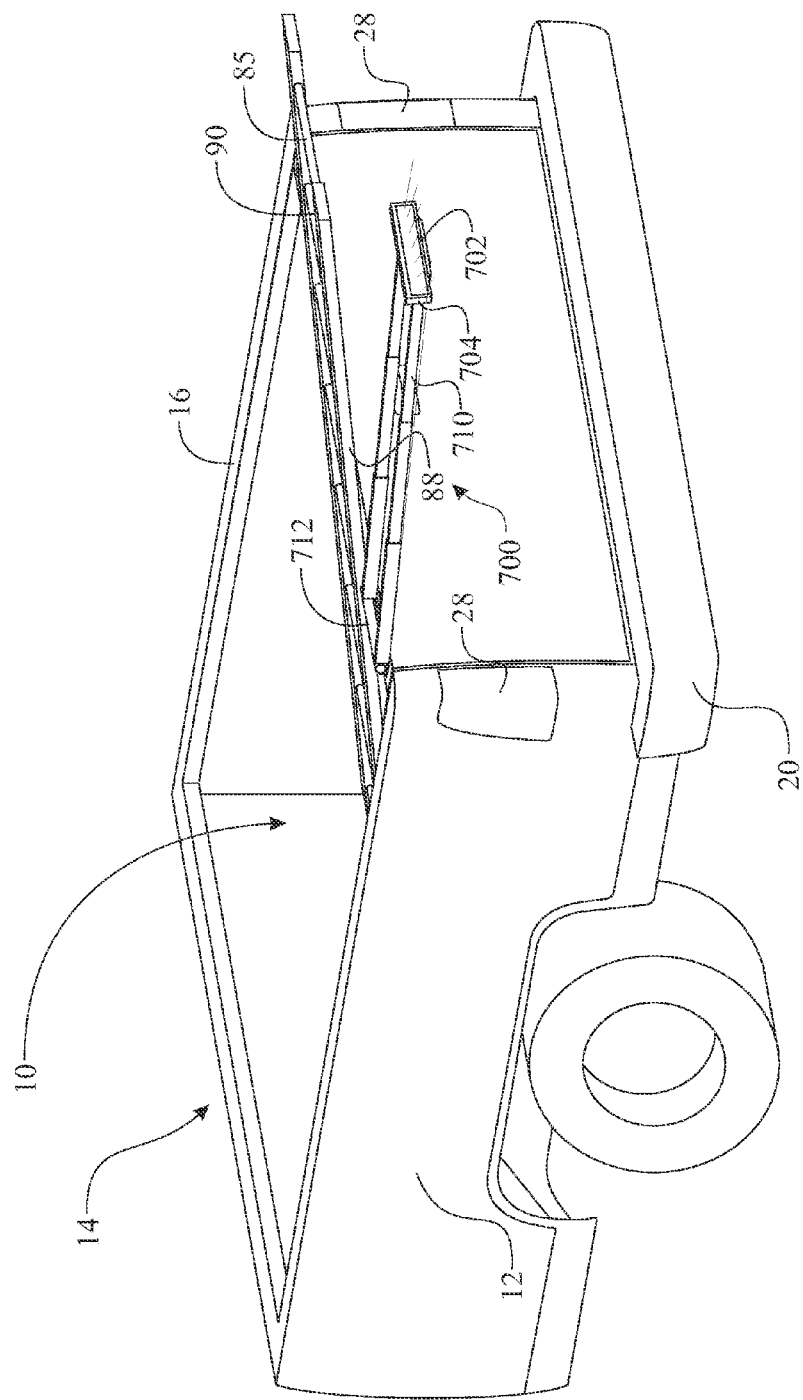
FIG. 23 presents an isometric view of a pivotal and telescoping safety light illustrated in an extended configuration to provided illumination at a proximate to an end of a projecting object.

FIG. 23 is an isometric view illustrating a telescoping tailgate safety light assembly 700 being integrated into the vehicle tailgate 18. A safety light 702 is provided within a safety light frame 704. The safety light frame 704 is attached to a distal end of a telescoping frame 710. The telescoping frame 710 slides outward from the upper surface of the vehicle tailgate 18 and pivots, using a pivoting member 712, into a horizontal configuration when the tailgate remains in a vertical orientation. The telescoping frame 710 extends positioning the safety light 702 proximate a projected end of an object extending rearward from the vehicle. The telescoping assembly can utilize a single arm, a pair of arms (as shown), and the like. It is understood that the safety light 702 and safety light frame 704 can include detachable features previously presented in FIG. 18.

Figure 24:
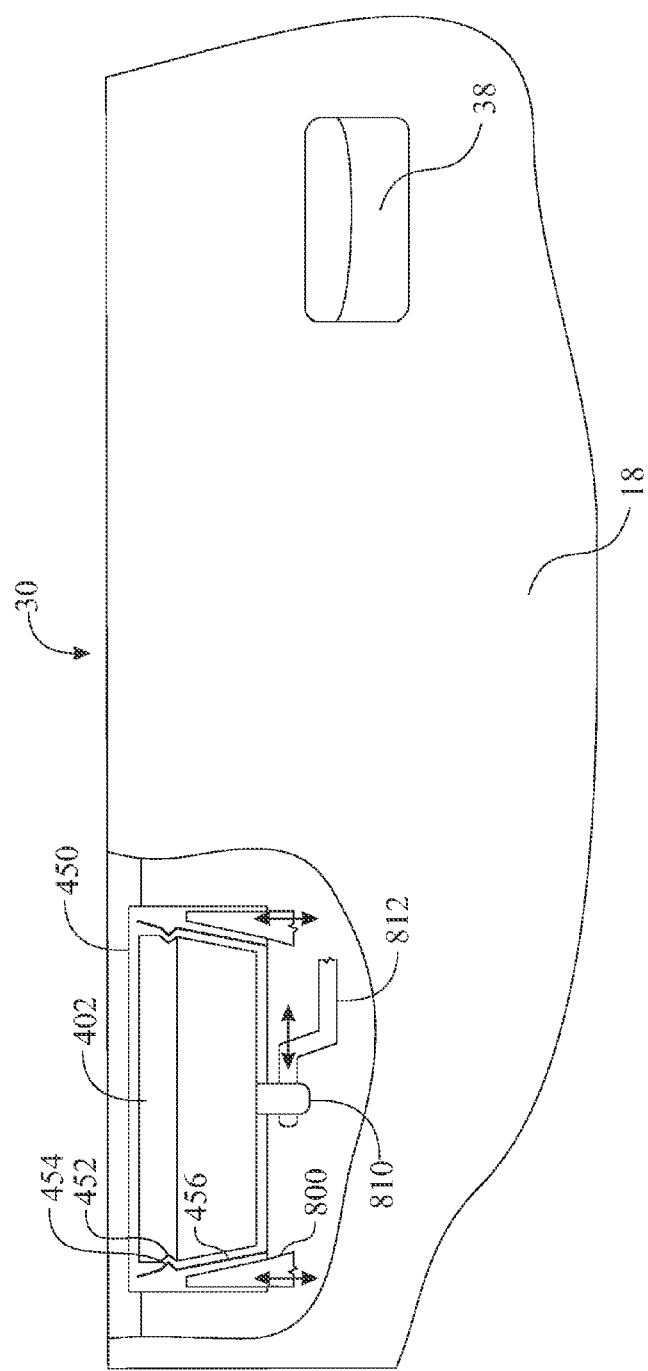
FIG. 24 presents a partially sectioned elevation view of several optional locking embodiments for securing the removable safety light within a respective housing.

FIG. 24 is a rear view of an exemplary vehicle tailgate 18 having a section of an outer skin removed illustrating two exemplary locking features for securing the primary angle viewing safety taillight 402 within the safety light assembly receptacle 450. A first exemplary locking interface utilizes at least one wedge locking member 800 which is removably inserted between the safety light coupling clip spring 456 and an outer wall of the safety light assembly receptacle 450. The wedge locking member 800 provides a wedge, which limits the motion of the safety light coupling clip spring 456, thus maintaining engagement between the safety light coupling recess 452 and the safety light coupling clip 454. This limitation to the motion of the safety light coupling clip spring 456 retains the primary angle viewing safety taillight 402 within the safety light assembly receptacle 450. A second exemplary locking interface utilizes a moveable locking member 812, which engages with a light lock engaging member 810. The light lock engaging member 810 is assembled to the primary angle viewing safety taillight 402. The moveable locking member 812 can engage within the light lock engaging member 810 in accordance with any known mechanical locking interface. The exemplary embodiment utilizes a moveable locking member 812, which repositions to engage and disengage with the light lock engaging member 810. The moveable locking member 812 comprises a pin that is inserted through an opening formed through the light lock engaging member 810, thus retaining the primary angle viewing safety taillight 402 within the safety light assembly receptacle 450.

It is recognized that accessories such as a bed liner or tailgate protector can be utilized; wherein the protector would comprise an aperture for the tailgate safety light(s).

Additionally, an indicator can be included inside the vehicle to inform the driver that the tailgate assembly is in a lowered orientation.

The illustrations are for presentation purposes and it is recognized that the details and actual reduction to practice may differ depending upon design.

The teachings herein depict the preferred embodiment of the present invention. It can be recognized that although the illustration and specification specifically describes the incorporation of a stepgate operating mechanism as described herein, alternative operating mechanism designs, such as slide bearings, different channels, and the like can be utilized while maintaining the spirit and intent of the present invention.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What we claim is:

1. A vehicle safety light system, comprising:
   a safety light assembly receptacle having a light assembly receiving cavity, wherein said safety light assembly receptacle is integrated into a body member of a vehicle; and
   a removable light assembly comprising:
      a removable light assembly housing sized and shaped to removably engage with said safety light assembly receptacle,
      at least one light emitting source carried within said removable light assembly housing,
      a power source provide by at least one of:
         a portable power source carried within said removable light assembly housing, and
         a retractable cable assembly having a connector for connection with a power source provided by said vehicle, and
      a functional control switch provided to control operation of at least one of said at least one light emitting source.

2. A vehicle safety light system as recited in claim 1, wherein said removable light assembly further comprising a red illuminating system located along an elongated longitudinal surface of said removable light assembly, wherein said elongated longitudinal surface remains exposed when said removable light assembly is inserted into said light assembly receiving cavity.

3. A vehicle safety light system as recited in claim 2, wherein said removable light assembly further comprising a white illuminating system located along at least one side of said removable light assembly housing, wherein said side is located proximate an end of an elongated longitudinal surface.

4. A vehicle safety light system as recited in claim 1, wherein said removable light assembly further comprising a white illuminating system located along at least one side of said removable light assembly housing, wherein said side is located proximate an end of an elongated longitudinal surface.

5. A vehicle safety light system as recited in claim 1, wherein said removable light assembly further comprising:
   a portable power supply carried within said removable light assembly housing, wherein said portable power supply is recharged by a cable extending between said safety light assembly receptacle and said power source provided by said vehicle; and
   an electrical connector providing electrical communication between said portable power supply within said removable light assembly and said safety light assembly receptacle.

6. A vehicle safety light system as recited in claim 1, said removable light assembly further comprising a portable tailgate safety light securing mechanism.

7. A vehicle safety light system as recited in claim 6, wherein said portable tailgate safety light securing mechanism is at least one of:
   a strap,
   an elastic strap,
   a strap comprising a dense hook and loop tape interface for adjusting a length of said strap,
   a magnet, and
   a hook.

8. A vehicle safety light system, comprising:
   a safety light assembly receptacle having a light assembly receiving cavity, wherein said safety light assembly receptacle is integrated into a body member of a vehicle; and
   a removable light assembly comprising:
      a removable light assembly housing sized and shaped to removably engage with said safety light assembly receptacle,
      a red illuminating system located along an elongated longitudinal surface, wherein said elongated longitudinal surface remains exposed when said removable light assembly is inserted into said light assembly receiving cavity;
      a white illuminating system located along at least one side of said removable light assembly housing, wherein said side is located proximate an end of an elongated longitudinal surface;
      a portable power source carried within said removable light assembly housing,
      a user operated functional control switch provided to control operation of each of the red illuminating system and the white illuminating system; and
   an operational control system in operational communication with a lighting system of said vehicle.

9. A vehicle safety light system as recited in claim 8, said user operated functional control switch further comprising an operational control feature which enables the user to select an operational mode from an operational mode group consisting of a continuous red light, a flashing red light, and a continuous white light.

10. A vehicle safety light system as recited in claim 8, wherein said removable light assembly further comprising a portable power supply recharging element, said portable power supply recharging element comprising:
    a cable extending between said safety light assembly receptacle and said power source provided by said vehicle; and
    an electrical connector providing electrical communication between said portable power supply within said removable light assembly and said safety light assembly receptacle.

11. A vehicle safety light system as recited in claim 8, said removable light assembly further comprising a portable tailgate safety light securing mechanism.

12. A vehicle safety light system as recited in claim 11, wherein said portable tailgate safety light securing mechanism is at least one of:
- a strap,
- an elastic strap,
- a strap comprising a dense hook and loop tape interface for adjusting a length of said strap,
- a magnet, and
- a hook.

13. A vehicle safety light system as recited in claim 8, said removable light assembly further comprising at least one safety light support leg, wherein said at least one safety light support leg supports the removable light assembly housing in a generally vertical orientation when placed on a supporting surface.

14. A vehicle safety light system as recited in claim 8, said safety light assembly receptacle further comprising a safety light coupling clip and said removable light assembly further comprising a safety light coupling recess, wherein said safety light coupling clip engages with said safety light coupling recess to retain said removable light assembly within said safety light assembly storage section of said safety light assembly receptacle.

15. A vehicle safety light system, comprising:
- a safety light assembly receptacle having a light assembly receiving cavity, wherein said safety light assembly receptacle is integrated into a body member of a vehicle; and
- a removable light assembly comprising:
  - a removable light assembly housing sized and shaped to removably engage with said safety light assembly receptacle,
  - a light emitting subassembly comprising a first light arrangement comprising a series of spatially arranged light emitting devices spanning along at least a portion of a longitudinal length thereof and at least one second light arrangement comprising at least one light emitting devices located proximate at least one end of said light emitting subassembly and proximate to an end of an elongated longitudinal surface
  - a red illuminating system located along an elongated longitudinal surface, wherein said elongated longitudinal surface remains exposed when said removable light assembly is inserted into said light assembly receiving cavity, said red illuminating system obtaining light emitted by said first light arrangement;
  - a white illuminating system located along at least one side of said removable light assembly housing, wherein said side is located proximate an end of said elongated longitudinal surface, said white illuminating system obtaining light emitted by said at least one second light arrangement;
  - a portable power source carried within said removable light assembly housing,
  - a user operated functional control switch provided to control operation of each of the red illuminating system and the white illuminating system; and
- an operational control system in operational communication with a power source provided by said vehicle.

16. A vehicle safety light system as recited in claim 15, said user operated functional control switch further comprising an operational control feature which enables the user to select an operational mode from an operational mode group consisting of a continuous red light, a flashing red light, and a continuous white light.

17. A vehicle safety light system as recited in claim 15, wherein said removable light assembly further comprising a portable power supply recharging element, said portable power supply recharging element comprising:
- a cable extending between said safety light assembly receptacle and said power source provided by said vehicle; and
- an electrical connector providing electrical communication between said portable power supply within said removable light assembly and said safety light assembly receptacle.

18. A vehicle safety light system as recited in claim 15, said removable light assembly further comprising a portable tailgate safety light securing mechanism.

19. A vehicle safety light system as recited in claim 15, said removable light assembly further comprising at least one safety light support leg, wherein said at least one safety light support leg supports the removable light assembly housing in a generally vertical orientation when placed on a supporting surface.

20. A vehicle safety light system as recited in claim 15, said safety light assembly receptacle further comprising a safety light coupling clip and said removable light assembly further comprising a safety light coupling recess, wherein said safety light coupling clip engages with said safety light coupling recess to retain said removable light assembly within said safety light assembly storage section of said safety light assembly receptacle.

* * * * *